US012077356B2

(12) United States Patent
Erickson et al.

(10) Patent No.: US 12,077,356 B2
(45) Date of Patent: Sep. 3, 2024

(54) DISPENSING SYSTEM

(71) Applicant: AptarGroup, Inc., Crystal Lake, IL (US)

(72) Inventors: Gregory A. Erickson, Wheaton, IL (US); Kelly A. Smith, East Troy, WI (US); Curt Prusko, Wauwatosa, WI (US); Katherine Schomberg, Waukesha, WI (US); James W. Hammond, Waukesha, WI (US)

(73) Assignee: AptarGroup, Inc., Crystal Lake, IL (US)

( * ) Notice: Subject to any disclaimer, the term of this patent is extended or adjusted under 35 U.S.C. 154(b) by 83 days.

(21) Appl. No.: 17/800,788

(22) PCT Filed: May 11, 2021

(86) PCT No.: PCT/US2021/031695
§ 371 (c)(1),
(2) Date: Aug. 18, 2022

(87) PCT Pub. No.: WO2021/231367
PCT Pub. Date: Nov. 18, 2021

(65) Prior Publication Data
US 2023/0091031 A1    Mar. 23, 2023

Related U.S. Application Data

(60) Provisional application No. 63/022,953, filed on May 11, 2020.

(51) Int. Cl.
*B65D 81/32* (2006.01)
*A47J 31/36* (2006.01)
(Continued)

(52) U.S. Cl.
CPC ...... *B65D 51/2835* (2013.01); *A47J 31/3623* (2013.01); *A47J 31/369* (2013.01);
(Continued)

(58) Field of Classification Search
CPC ............ B65D 81/3211; B65D 51/2835; B65D 51/2814; B65D 51/2807; B65D 81/3238; B65D 17/42
(Continued)

(56) References Cited

U.S. PATENT DOCUMENTS 4,898,293 A * 2/1990 Morel ................ B65D 81/3211
215/250
7,870,952 B2 * 1/2011 Fontana ............. B65D 51/2814
206/219
(Continued)

FOREIGN PATENT DOCUMENTS

WO    2019/183301 A1    9/2019

OTHER PUBLICATIONS

Written Opinion and Search Report dated Aug. 6, 2021 for PCT/US2021/031695 of which this is subject application a US National Phase.

*Primary Examiner* — Steven A. Reynolds
(74) *Attorney, Agent, or Firm* — Wood, Phillips, Katz, Clark & Mortimer

(57) ABSTRACT

A dispensing system (40) includes a body (54) having an outer wall (64) defining a volume for storing a substance, the outer wall (64) having a top end (66) and a sealed bottom end (70). The top end (66) is covered by a flexible lid (56) that is attached to the body (54). The lid (56) has a press portion (88) for being engaged to move the lid (56) from a first position into a second, deflected position. A post (58) is connected to the lid (56) and is configured in the second position of the lid (56) to breach the sealed bottom end (70)
(Continued)

forming a dispensing orifice (80) to accommodate movement of a substance out of the body (54). In one form, the outer wall (64) includes at least one bottle stop projection (218) defining one or more vent channels (219).

19 Claims, 26 Drawing Sheets

(51) Int. Cl.
    *B65D 17/00*     (2006.01)
    *B65D 17/44*     (2006.01)
    *B65D 51/28*     (2006.01)
(52) U.S. Cl.
    CPC ............. *B65D 17/02* (2013.01); *B65D 17/44* (2018.01); *B65D 81/3211* (2013.01)
(58) Field of Classification Search
    USPC .................................................. 206/219, 222
    See application file for complete search history.

(56) References Cited

U.S. PATENT DOCUMENTS

| | | | |
|---|---|---|---|
| 8,839,982 B1* | 9/2014 | Anderson | B65D 51/2835 |
| | | | 220/267 |
| 8,960,424 B1* | 2/2015 | Anderson | B65D 51/2835 |
| | | | 206/219 |
| 9,132,950 B1* | 9/2015 | Anderson | B65D 81/32 |
| 9,242,772 B1* | 1/2016 | Anderson | B65D 51/2835 |
| 9,242,773 B1* | 1/2016 | Anderson | B65D 47/0838 |
| 9,567,142 B1* | 2/2017 | Anderson | B65D 51/2835 |
| 10,238,803 B2* | 3/2019 | Kumar | A61J 1/2093 |
| 2009/0120528 A1 | 5/2009 | Fisher et al. | |
| 2010/0200437 A1 | 8/2010 | Coon | |
| 2011/0174642 A1 | 7/2011 | Coon | |
| 2015/0203260 A1* | 7/2015 | Kim | B65D 51/2814 |
| | | | 426/112 |
| 2019/0375574 A1 | 12/2019 | Anderson et al. | |
| 2021/0024249 A1* | 1/2021 | Hammond | B65D 17/44 |

* cited by examiner

DISPENSING SYSTEM

PRIORITY

This application claims priority of U.S. Provisional Patent Application No. 63/022,953, filed May 11, 2020, the entire contents of which is incorporated herein by reference.

TECHNICAL FIELD

The present invention relates generally to a dispensing system for dispensing a substance into a container of another substance or onto some other target region.

BACKGROUND OF THE INVENTION AND TECHNICAL PROBLEMS POSED BY THE PRIOR ART

Many types of containers of substances are provided to a user initially in a closed condition that requires the user to remove or open a closure to gain access to the contents of the container. Such a container may be a bottle, flexible pouch, machine, vessel, etc., having an interior accessible through an opening in the container. A typical closure may be a cap, cover, or lid arranged at an opening to the container interior and is cooperatively received by a receiving structure on the container. Such a receiving structure may include mating threads, snap-fit beads or grooves, toggle clamps, friction fittings, or other such features.

Various materials or substances may be stored in the container, such as medicaments, additives, oils, lotions, creams, gels, liquids, food items, granules, powders, etc. The container with the closure mounted thereon, and the contents stored therein, may be characterized as a "package."

Some substances such as powders or liquids benefit from being stored in a concentrated form until mixed with another substance (e.g., water or another liquid or other material) in the container just prior to use or consumption. Current powders or liquids may be stored in a package that cannot easily be opened by a user and combined with another substance stored in a container in a clean manner. Furthermore, current powders or additives may be stored in a package that cannot easily be used with a wide variety of containers having different sized container openings.

The inventors of the present invention have determined that it would be desirable to provide a single dose dispensing system for substances that may be used with a variety of containers having differently sized container openings. The inventors of the present invention have further found that it would be beneficial to provide a dispensing system that would be easily and ergonomically actuated by a user.

The inventors of the present invention have also determined that, in many applications, it may be desirable to provide an improved dispensing system that minimizes the likelihood of inadvertent opening of the dispensing system during shipping or handling wherein the improved dispensing system eliminates the need for any additional protective packaging, such as a larger box or carton, or the inclusion of dampening structures or inserts that would otherwise be included to minimize the likelihood of the inadvertent actuation of the dispensing system.

The inventors of the present invention have also determined that it would be desirable to provide an improved dispensing system with recessed actuation features that (1) minimizes the likelihood of inadvertent actuation of the dispensing system during shipping or handling, and (2) would actuate only when engaged by a user applying a specific, yet simple, action.

In addition, the inventors of the present invention have determined that, in many applications, it may be desirable to provide an improved dispensing system that minimizes the potential for nesting during shipping of components of the system.

The inventors of the present invention have determined that it would be desirable to provide an improved dispensing system with increased stability when mounted atop a container without sacrificing internal volume of the system while avoiding the potential for vapor lock when mounting the system atop a container.

Further, the inventors of the present invention have determined that it would be beneficial in many applications to provide an improved dispensing system that can include or exhibit one or more of the following additional features or capabilities: (1) substantially universal compatibility with many types of sizes of containers (especially water bottles) without the need for the consumer to recognize and select a container having a particular neck size; and (2) a small format and size that permits the user to easily carry only the dispensing system on his or her person to another location where the user can then procure a container with which to use the dispensing system at the user's choice of location.

Also, the inventors of the present invention have determined that it can be beneficial for a supplier of an additive to sell and ship a separate, smaller concentrated additive dispensing package without a larger container that would be required for a pre-mixed product containing the additive already combined with another substance (e.g., water). This could provide savings in transportation costs and could advantageously allow the user or consumer to decide when, where, and into what other product to dispense the additive.

Further, the inventors of the present invention have determined that it can be desirable in some applications to provide such an improved dispensing system that accommodates dispensing a substance directly onto a target area or region, such as onto food on a plate or held in the hand, as well as, or instead of, into another substance stored in the interior of a container.

The inventors of the present invention have also determined that it would be desirable to provide an improved dispensing system that can be configured for use with dispensing a stored substance into a container of a fluent substance so as to have one or more of the following advantages: (1) an improved ease of manufacture and/or assembly, and (ii) a reduced cost of manufacture and/or assembly by reduction of resin usage.

The inventors of the present invention have invented a novel structure for a dispensing system for use with dispensing a stored substance into a container, or onto some other target region, wherein the system includes various advantageous features not heretofore taught or contemplated by the prior art.

SUMMARY OF THE INVENTION

According to broad aspects of one form of the present invention, a dispensing system is provided for use in dispensing a substance that may be stored within the system. The system includes a body having an outer wall defining an internal volume for storing a substance. The outer wall has an open top end and a sealed bottom end. The system includes a flexible lid that is connected to the body to cover the open top end. The lid has a press portion for being engaged by a user of the system. The lid has a first position and a second position moved relative to the first position, wherein in the second position at least a portion of the lid is deflected toward the sealed bottom end of the body. The system further includes a post connected to at least one of the body or the lid. Preferably, the post is connected to the lid. The post is configured in the second position of the lid to breach the sealed bottom end of the body to create a dispensing orifice to accommodate movement of a substance out of the body.

In one broad form of the invention, the exterior surface of the outer wall includes at least one bottle stop projection extending therefrom.

In another broad form of the present invention, the lid includes a radially-outward, annular portion defining a top end and the press portion is located at a recessed position axially inwardly of the annular portion in the first position of the system.

In still another broad form of the present invention, the sealed bottom end of the body includes a frangible portion of the body that is breached by movement of the post with the lid in the second position to create the dispensing orifice. The frangible portion of the body is preferably one of a plurality of J-shaped intersecting lines of reduced thickness material of the body centered on a central axis of the system, or an annular line of reduced thickness material of the body centered on a central axis of the system, or a plurality of radially extending lines of reduced thickness material of the body centered on a central axis of the system.

According to another broad form of the present invention, the lid includes at least one laterally outwardly extending flexible frustoconical flange for securing the lid with the body.

According to yet another broad form of the present invention, the post has a leading edge and a trailing edge, wherein the leading edge is located further than the trailing edge away from the press portion in an axial direction along a central axis of the system. Preferably, the post includes a wall with a helical configuration, or the post includes at least two transverse walls that intersect in a cross-shaped configuration, or the post includes a plurality of walls that intersect in a star-shaped configuration.

According to another aspect of the present invention, the exterior surface of the outer wall includes a plurality of bottle stop projections arranged concentrically around a central axis of the system. In one preferred form of the invention, the bottle stop projection or projections have the form of an elongate, arcuate bead extending around the central axis of the system. More preferably, the bottle stop projection or projections define(s) a leading end and a trailing end in a spaced-apart, confronting configuration to define at least one vent channel therebetween. Still more preferably, an arc length of each concentric bottle stop projection increases with an increase in the radial distance away from the central axis.

According to another preferred form of the present invention, the plurality of bottle stop projections define a plurality of vent channels. In one preferred form, the plurality of vent channels have offset angular locations relative to the central axis, and in another preferred form the vent channels are aligned at the same angular location relative to the central axis.

In one preferred form of the present invention, the exterior surface of the outer wall defines an annular wall that extends axially downwardly around the sealed bottom end.

In still another preferred form of the present invention, the lid includes at least one laterally outwardly extending flexible frustoconical flange and the body includes at least one laterally inwardly extending bead cooperating together for securing the body with the lid. More preferably, the flexible frustoconical flange slopes radially inwardly toward a central axis of the system in an axially downward direction toward a leading edge of the post.

In one aspect of the present invention, the lid includes an annular plug, and the body includes an internal sealing wall connected to the outer wall by at least one supporting rib.

According to another aspect of the present invention, the lid includes a radially-outward, annular portion connecting to an axially-inwardly extending wall, where the axially-inwardly extending wall connects to a convex, axially-outwardly extending dome that defines the press portion of the lid.

In still another form of the present invention, the sealed bottom end of the body slopes radially inward toward a central axis of the system in the direction away from the open top end of the body.

According to another aspect of the present invention, the system is sized and shaped to accommodate a container having an opening diameter between about 28 millimeters and about 51 millimeters.

In still another form of the present invention, the dispensing system is provided in combination with a fluent substance, the system and the fluent substance together defining a package.

It should be appreciated that the invention may include any or all of the above-described features, include only one of the above-described features, more than one of the above-described features, and any combination of the above-described features. Furthermore, other objects, features and advantages of the invention will become apparent from a review of the entire specification including the appended claims and drawings.

BRIEF DESCRIPTION OF THE DRAWINGS

FIG. 1 shows the system in an unactuated configuration with the lid in its first position;

FIG. 2 shows a sealed bottom of the system body intact prior to being breached to create a dispensing orifice;

FIG. 12 shows a sealed bottom of the system body intact prior to being breached to create a dispensing orifice;

FIG. 13 shows a sealed bottom of the system body intact prior to being breached to create a dispensing orifice;

FIG. 17 shows a sealed bottom of the system body intact prior to being breached to create a dispensing orifice;

FIG. 22 shows a sealed bottom of the system body intact prior to being breached to create a dispensing orifice;

FIG. 26 shows the lid in an actuated, second position to dispense a substance into the container.

DESCRIPTION OF THE PREFERRED EMBODIMENTS

While this invention is susceptible of embodiment in many different forms, this specification and the accompanying drawings disclose only specific forms as examples of the invention. The invention is not intended to be limited to the embodiments so described, and the scope of the invention will be pointed out in the appended claims.

Figure 26:
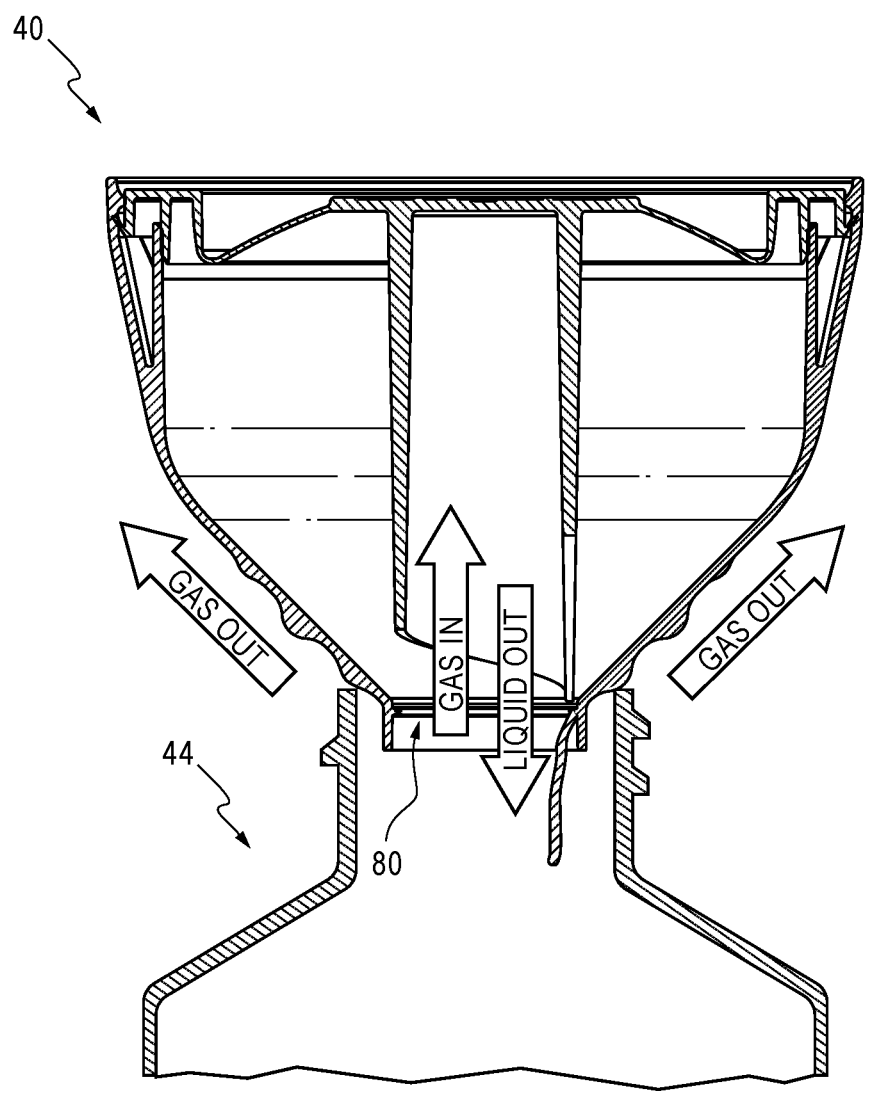
FIG. 26 is a cross-sectional view of the system of FIG. 1 mounted at an opening of a container, taken in a vertical cross-sectional plane containing a central axis of the system.

For ease of description, many figures illustrating the invention show embodiments of a dispensing system in the typical orientation that the system would have when located at the opening of a container such as an upright bottle, and terms such as "inward", "outward", "upper", "lower", "axial", "radial", "lateral", etc., are used with reference to this orientation. The term "axially inward" is to be understood as in the direction along a central axis 30 of the system, toward the interior of a container when the system 40 is mounted atop the opening of a container 40, as is illustrated in FIG. 26. The term "axially outward" is to be understood as in the opposite direction along the central axis 30, away from the interior of the container. The term "radially inward" is to be understood as in the radial direction toward the central axis 30. The term "radially outward" is to be understood as in the radial direction away from the central axis 30. The term "laterally inward" is to be understood as in a direction toward the central axis 30, in a plane normal or transverse to the central axis 30. The term "laterally outward" is to be understood as in a direction away from the central axis 30, in a plane normal or transverse to the central axis 30. It will be understood, however, that the system of this invention may be manufactured, stored, transported, used, and sold in an orientation other than the specific orientations described and illustrated herein.

The dispensing systems of this invention are especially suitable for use with a variety of conventional or special containers, the details of which, although not fully illustrated or described, would be apparent to those having skill in the art and an understanding of such containers. The particular container illustrated is not intended to limit the present invention. It will also be understood by those of ordinary skill that novel and non-obvious inventive aspects are embodied in the described systems alone.

The dispensing systems described herein are especially suitable for use in dispensing a fluent substance as an additive into a container that contains a liquid such as water. Such dispensed fluent substances may be, for example, food additives, a personal care product, an industrial product, a household product, or other types of products. Such substances may be for internal or external use by humans or animals, or for other uses (e.g., activities involving medicine, commercial or household maintenance, agriculture, manufacturing, etc.).

Illustrated embodiments of a dispensing system of the present invention are illustrated in the accompanying figures, wherein the system is designated generally by the reference number 40. The illustrated embodiments of the system 40 have the form of a self-contained article or package that is configured to be (i) selectively placed at an opening of a container 44 (FIG. 26 only) and (ii) actuated to dispense a fluent substance such as a concentrated powder or liquid into the container 44. The container 44 illustrated has the form of a bottle that would typically contain another fluent substance (e.g., water). The fluent substance to be dispensed from the system 40 is not illustrated in the figures because the substance may take a variety of forms. The container 44 is typically provided initially with a cap or other closure (not illustrated) that can be removably mounted to the container with threads for mating with threads on the container 44. The closure is first removed by the user prior to the user placing the system 40 on the opening of the container 44. Closure mounting features other than mating threads could be used, such as snap-fit beads and grooves, toggle clamps, friction fittings, etc.

It will be understood that the container 44 may be any conventional type, such as a collapsible, flexible pouch, or may be a generally rigid bottle that has somewhat flexible, resilient walls. It will further be understood that, for some applications, the system 40 may be used to dispense a substance outside of, or apart from, a container—such as directly onto a target area (e.g., a handheld item of food or other material).

The container, or a portion thereof, may be made from a material suitable for the intended application. For example, the container may be a pouch made from a thin, flexible material (wherein such a material could be a polyethylene terephthalate (PET) film or a polyethylene film and/or an aluminum foil). Alternatively, a more rigid container (e.g., a bottle) could be made from a thicker, less flexible material such as molded polyethylene, polypropylene, polyethylene terephthalate, polyvinylchloride, glass, metal, or other materials.

It is contemplated that typically, after the dispensing system manufacturer would make the dispensing system 40 (e.g., by molding its components from a thermoplastic polymer), the manufacturer will then ship the unassembled components of the dispensing system 40 to a filler facility at another location where the system 40 would be filled with a product and sealed in the form of a package that would be encountered by a customer or user of the system 40.

With reference to the accompanying FIGS. 1-11 and 26, a first embodiment of a dispensing system, or simply referred to hereinafter as a "system", 40 includes the following basic components: a generally hollow base or body 54; and a flexible lid 56 that is mounted atop the body 54, wherein the lid 56 includes a post 58 extending into the hollow interior of the body 54. The body 54 defines an internal volume for storing a fluent substance to be dispensed. Along the central axis 30 of the system 40, the lid 56 is flexible (e.g., resiliently deflectable or in some alternative embodiments permanently deformable), whereby the lid 56 has an unactuated or as-manufactured first position and may be pressed by a finger or thumb of a user of the dispensing system 40 to move the lid 56 into an actuated, second position. Movement of the lid 56 axially inwardly or downwardly into its second position causes the post 58 to breach a bottom portion or bottom seal on the body 54 to form a dispensing orifice to permit the dispensing of the stored substance from the system 40. The smooth exterior surface of the body 54 may be considered more aesthetically appealing to the consumer, compared to prior art devices or systems, and allows for the use of a decorative shrink sleeve.

Preferably, the dispensing orifice created by the movement of the post 58 may be located at the opening of a container 44 or a target area so that the user can dispense the substance stored within the system 40 to the container 44 or target area.

The body 54, lid 56, and post 58 are preferably formed or molded from a suitable thermoplastic material such as polypropylene or polyethylene. Other materials may be employed instead. It will be understood that in alternative designs (not illustrated), one or more of the basic components or sub-components may be separately or sequentially formed or molded (such as through bi-injection molding). Alternatively, the basic components may be molded initially as one connected, unitary structure, and then broken apart, and then re-assembled into an operative combination or assembly.

The lid 56 may be connected to the body 54 of the system 40 by any special or conventional means, such as by a ring-like foil or composite liner (not illustrated) which can be permanently sealed to, and between, the lid 56 and the body 54 by use of radio-frequency welding or an induction heating process. An exemplary foil liner is described in U.S. Pat. No. 7,721,901 and International Publication No. WO 2019/183301 A1, the disclosures of which are incorporated herein in their entirety. In some applications, the liner may be omitted as is illustrated in FIGS. 1-11, and 26, and the lid 56 may be removably or non-removably connected to the body 54 by a hinge, a screw thread, a tether, adhesive, heat weld, snap fit connections, flanges or mating beads, as will be discussed in greater detail below. In alternative embodiments, the lid 56 may be unitarily formed with the body 54 and folded about a hinged connection into the assembled first position.

Figure 3:
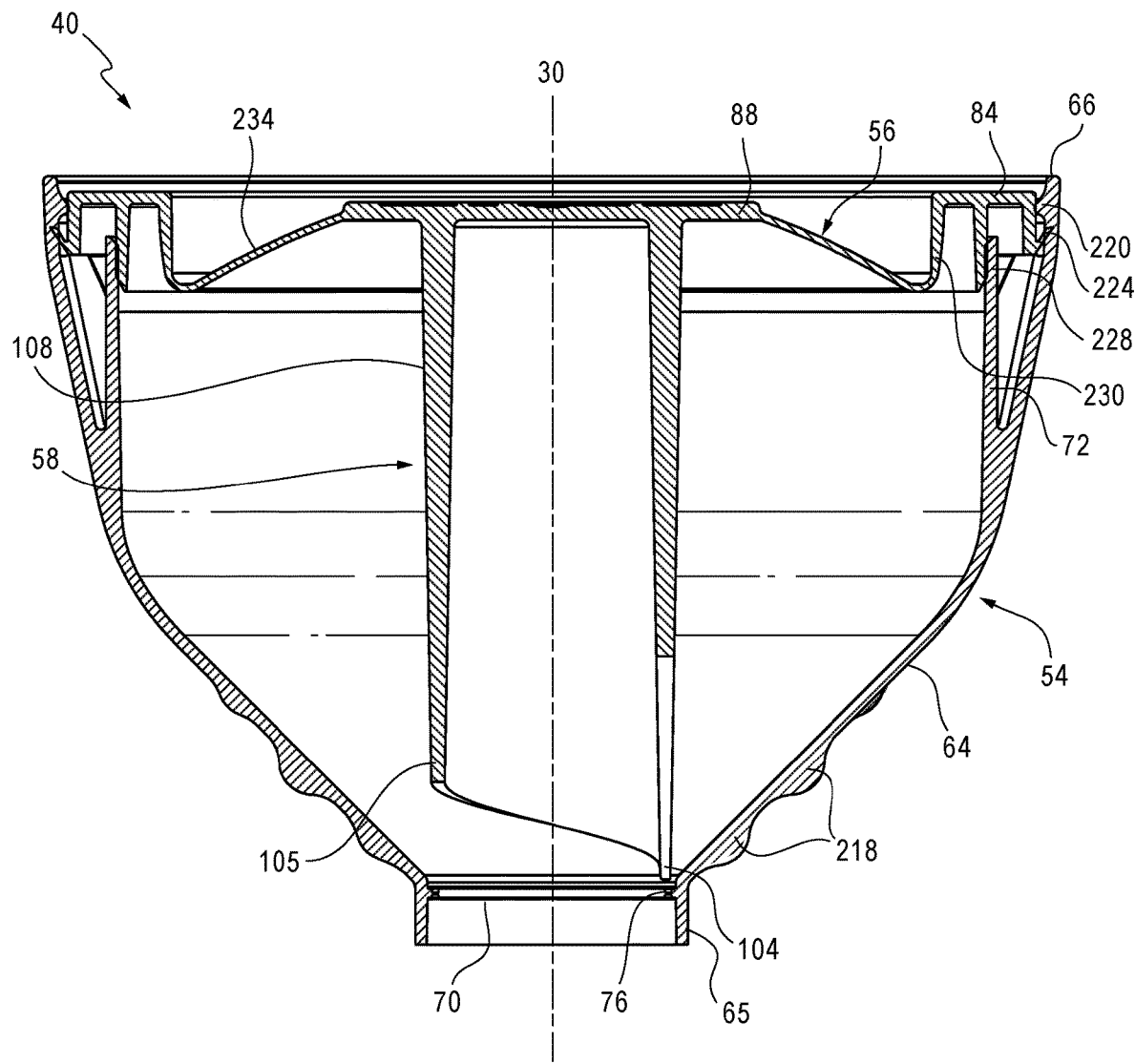
FIG. 3 is a cross-sectional view of the system of FIG. 1, taken in a vertical cross-sectional plane containing a central axis of the system.

With reference now to FIG. 3, the closure body 54 includes an outer wall 64 having a top end 66 defining a generally circular opening. The outer wall 64 further defines an axially extending annular wall 65 that extends around a membrane or sealed bottom end 70 of the body 54 to assist in centering and maintaining the dispensing system 40 at the openings of some containers. The outer wall 64 defines an interior surface for being in contact with the fluent substance and an exterior surface for optionally contacting the open end of a container 44 (illustrated only in FIG. 26). The interior of the body 54 defines a volume for storing a fluent substance. The body 54 has a conical or cup-like shape, and the exterior surface accommodates different sized openings or neck finishes of different containers. The sealed bottom end 70 of the body 54 is thin and planar, and adapted to be located at the opening of a container, such as the container 44, so as to communicate with an interior of the container 44, as will be discussed in greater detail herein. Preferably, the system 40 is configured for accommodating containers 44 having an opening diameter or neck finish between about 28 mm and about 51 mm. It will be understood that the body 54 may take a variety of shapes, such as polygonal, tube-shaped, or other irregularly shaped geometries depending on the application and/or the container opening geometry.

Figure 8:
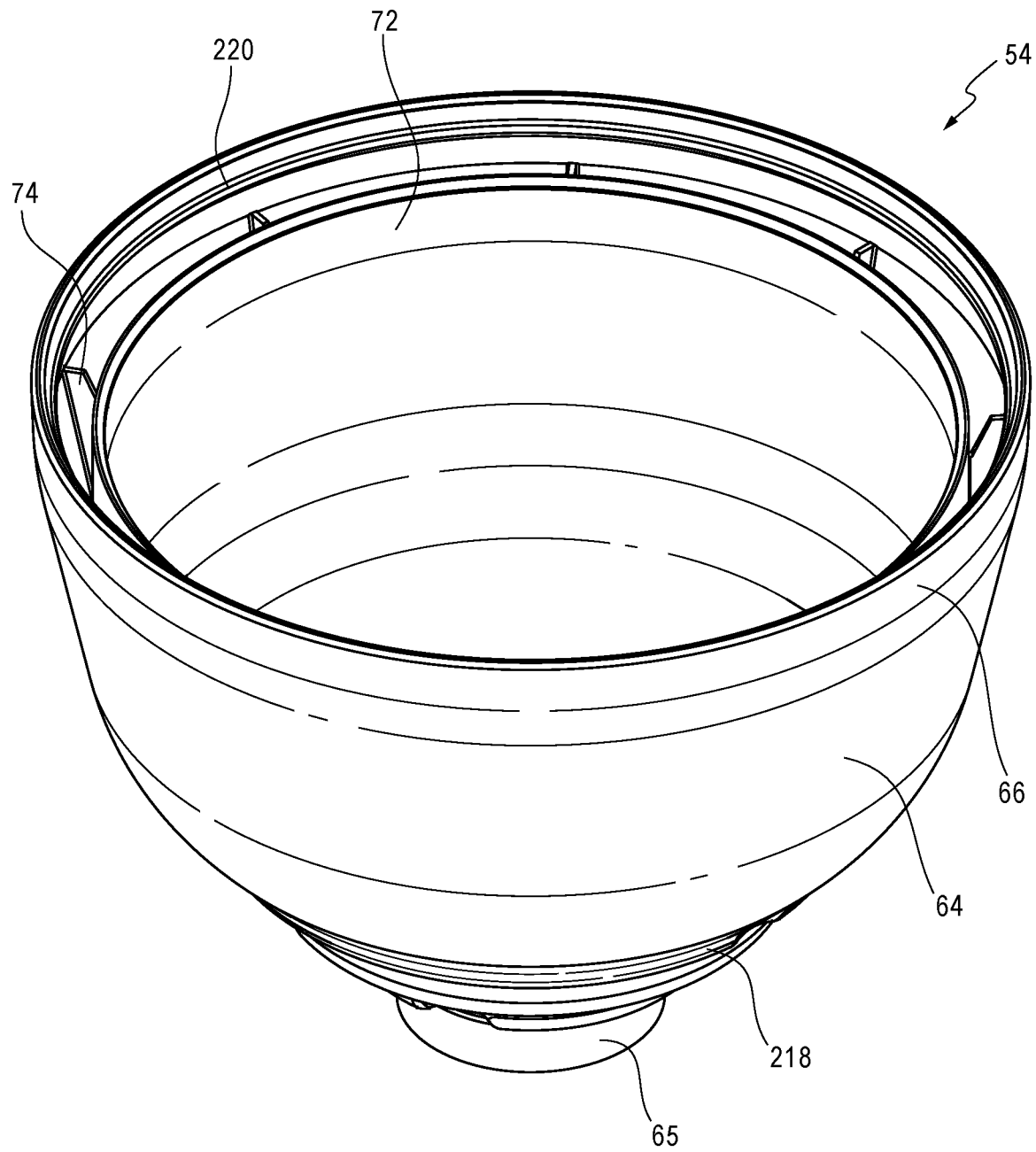
FIG. 8 is an isometric view from the front and above of only the body of the system of FIG. 1.
Figure 9:
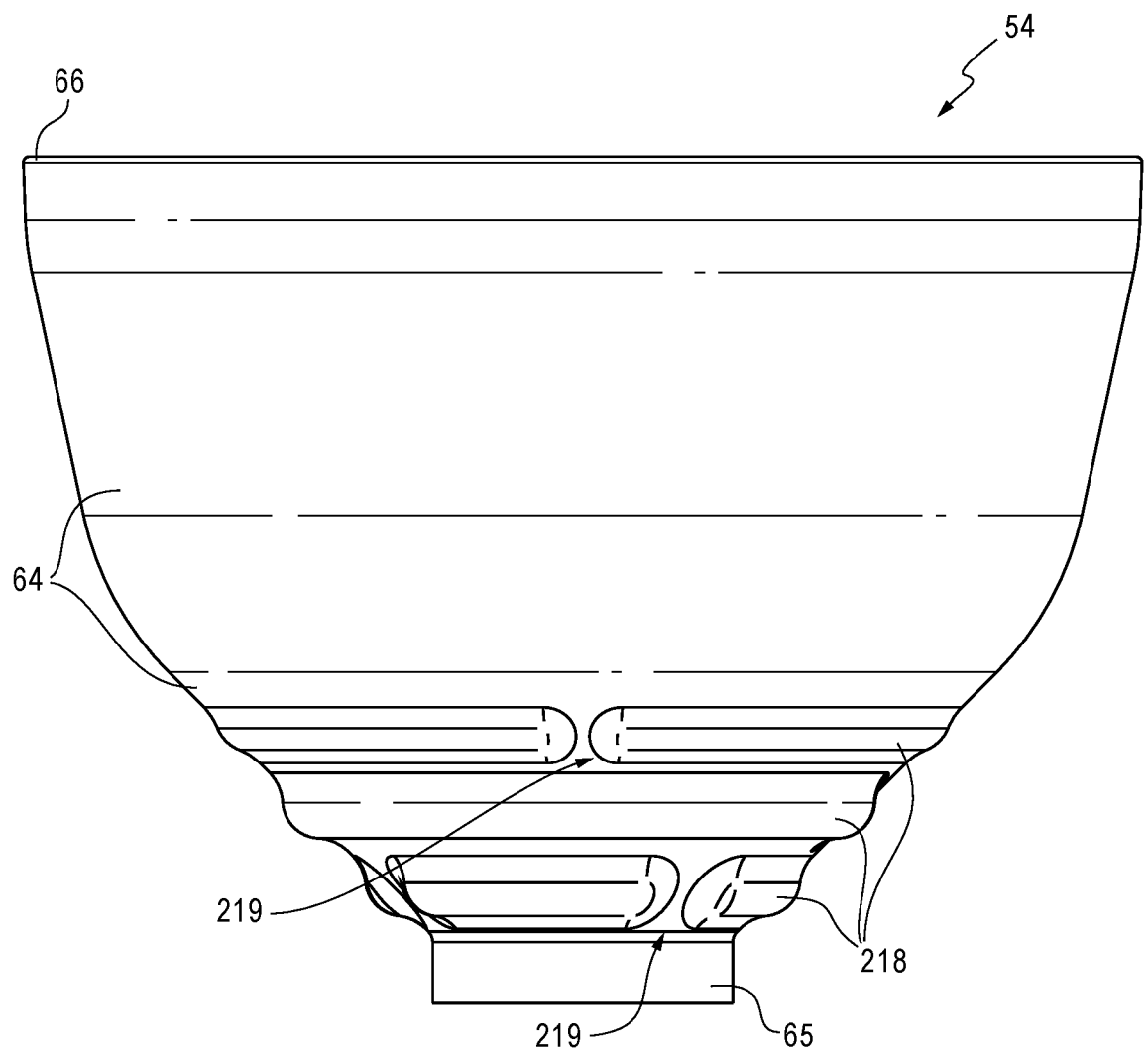
FIG. 9 is a right-side elevation view of the body of FIG. 8.

With reference to FIG. 8, the body 54 has an advantageous double wall configuration with an internal sealing wall 72 that is connected to the outer wall 64 by a plurality of radially extending supporting ribs or bridges 74. The internal sealing wall 72 functions to seal against a mating plug seal element of the lid 56 to establish an annular internal seal to maintain the integrity of the fluent substance within the internal volume of the body 54. The inventors have found that the provision of the internal sealing wall 72 allows for some distortion of the attachment means between the lid 56 and the body 54 without compromising the seal therebetween, which will be discussed in greater detail below.

Figure 10:
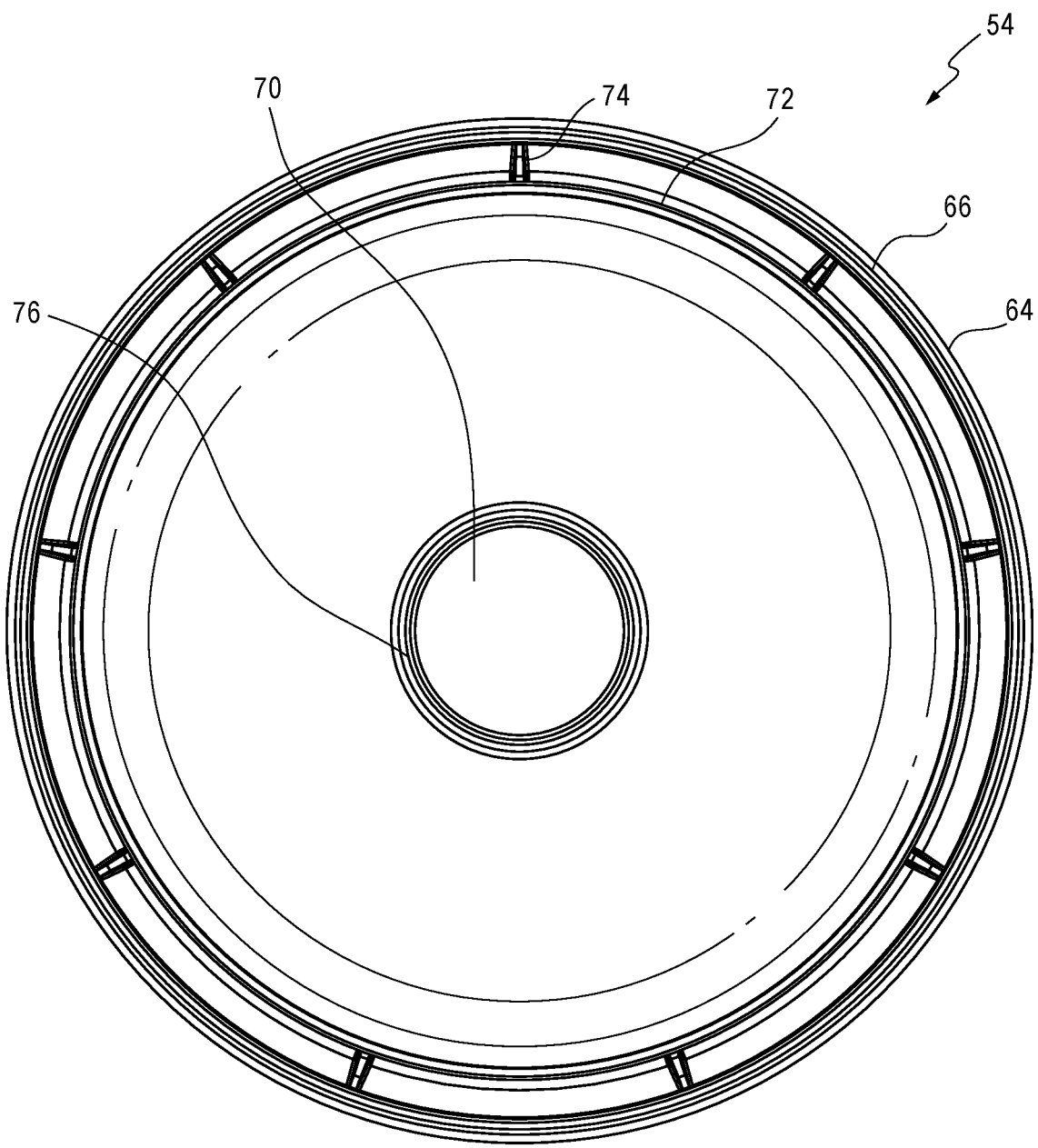
FIG. 10 is a top plan view of the body of FIG. 8.
Figure 11:
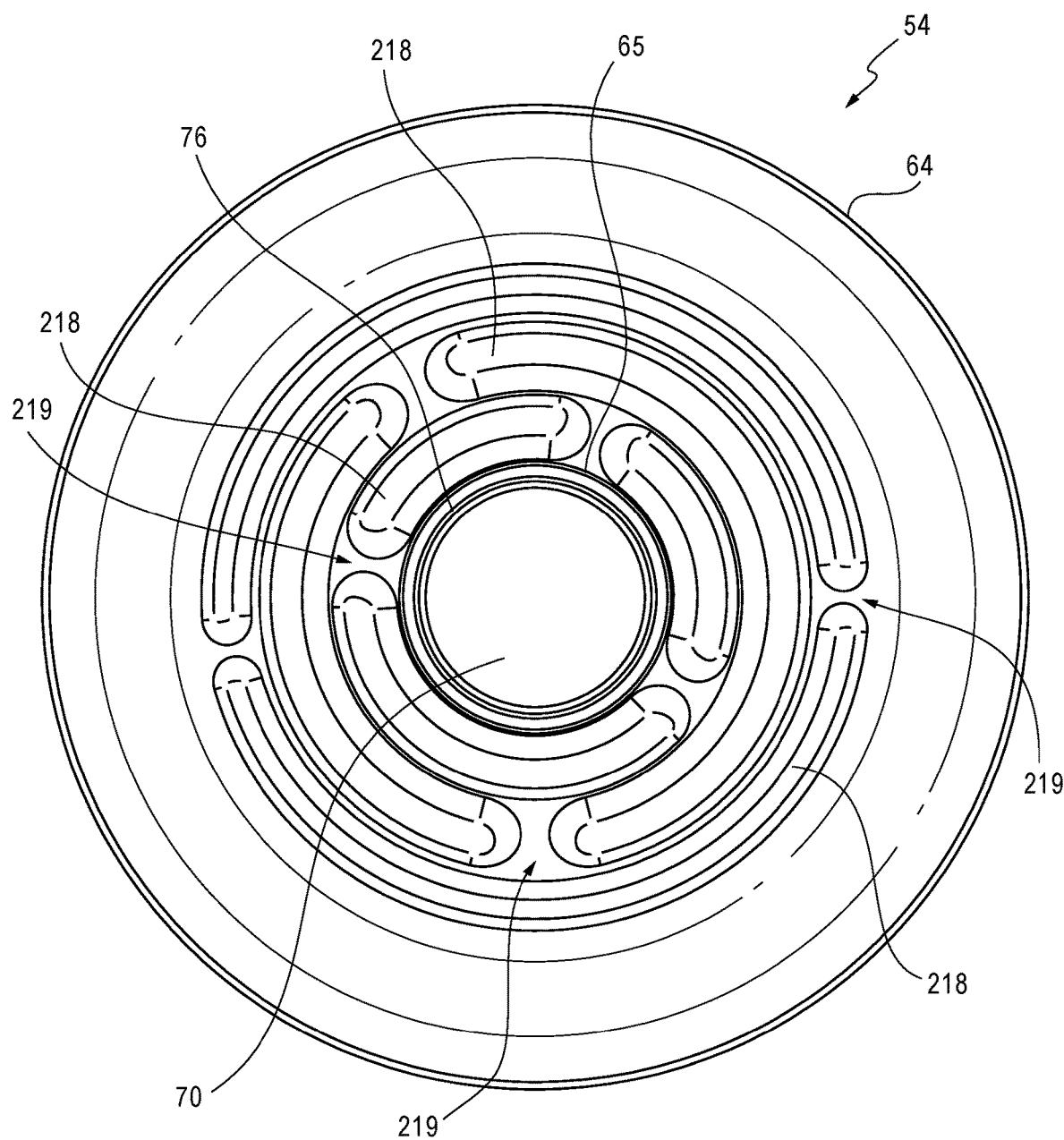
FIG. 11 is a bottom plan view of the body of FIG. 8.

Referring now to FIGS. 3, 10, and 11, the sealed bottom end 70 of the body 54 includes a frangible region of material in the form of a reduced-thickness channel or line 76 that is integrally molded with the body 54 to define a line of preferential weakness. The line 76 in the first illustrated embodiment of the system 40 has the form of a circle extending around the periphery of the end 70. As will be discussed in greater detail hereinafter, the line 76 is configured to tear or rupture when engaged by the post 58, which causes a broken portion or petal of the sealed bottom end 70 to open axially downward, yet remain connected to the remainder of the outer wall 64 of the body 54. Opening of the petal defines a dispensing orifice 80 (visible in FIG. 26 only) in the bottom of the body 54 to permit flow of a substance from the interior of the body 54 to the exterior of the body 54 (into a container 44 or onto another target location).

The inventors of the present invention have found that molding the sealed bottom end 70 with the frangible line 76 to define a frangible region or portion of the body 54 advantageously eliminates the need for a secondary, separate seal that would otherwise be required to cover a body having an open-molded bottom end. This may reduce the cost of manufacture and/or assembly of the system 40, and further may increase the robustness of the system 40, after it has been assembled and filled with a product, as well as during shipping, handling, and/or storage thereof.

Figure 4:
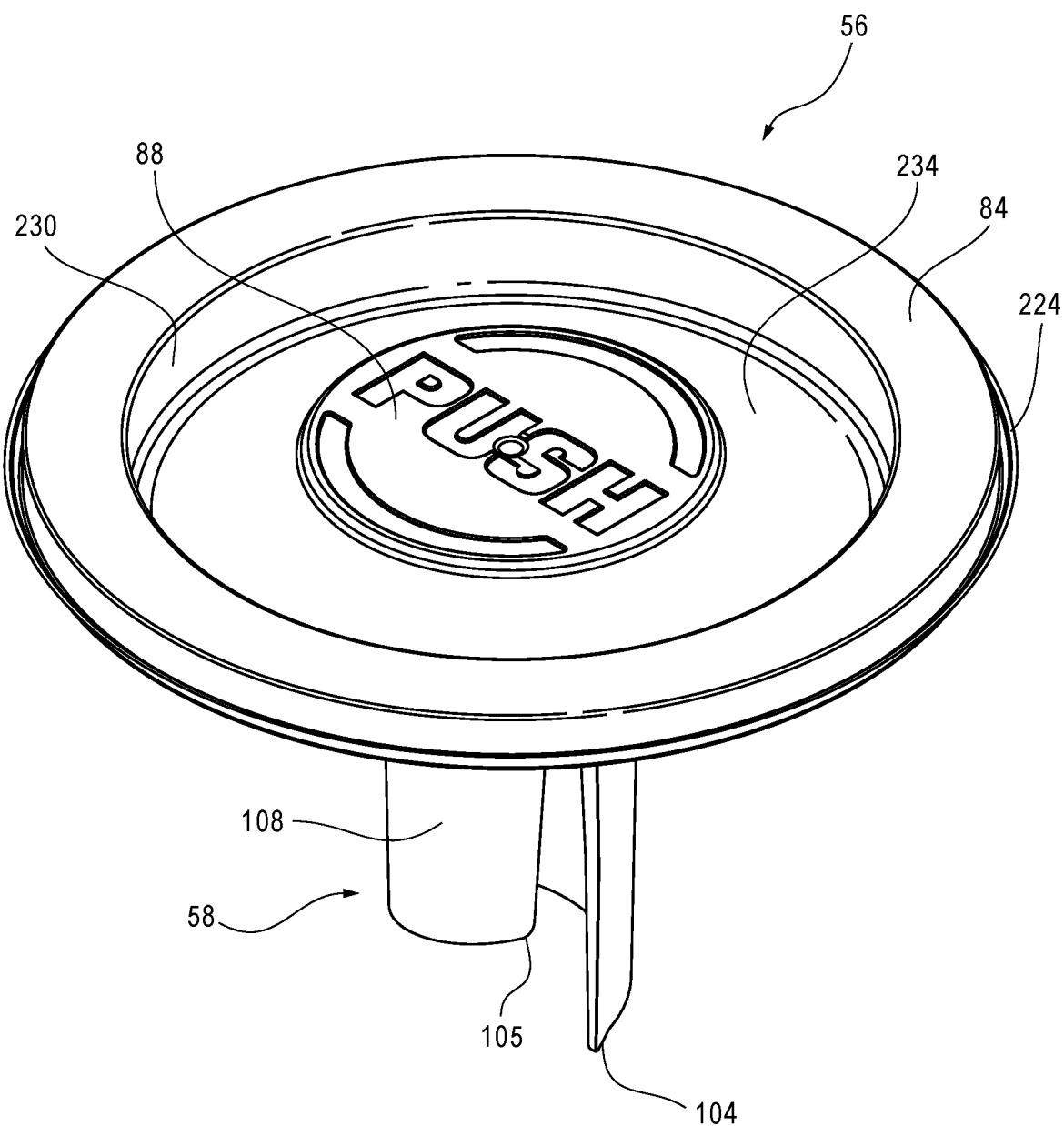
FIG. 4 is an isometric view from the front and above of only the lid of the system of FIG. 1.
Figure 5:
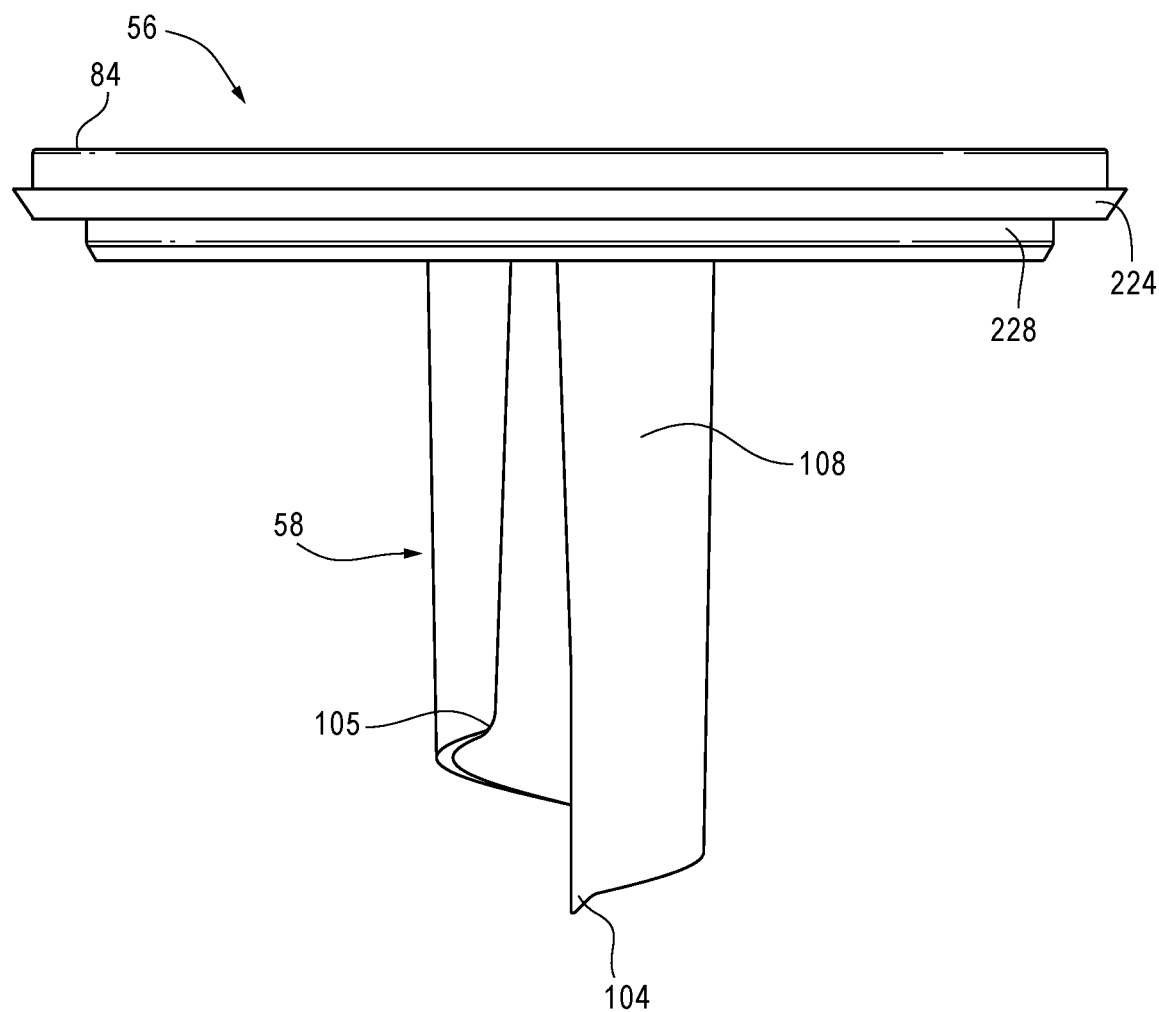
FIG. 5 is a right-side elevation view of the lid of FIG. 4.
Figure 6:
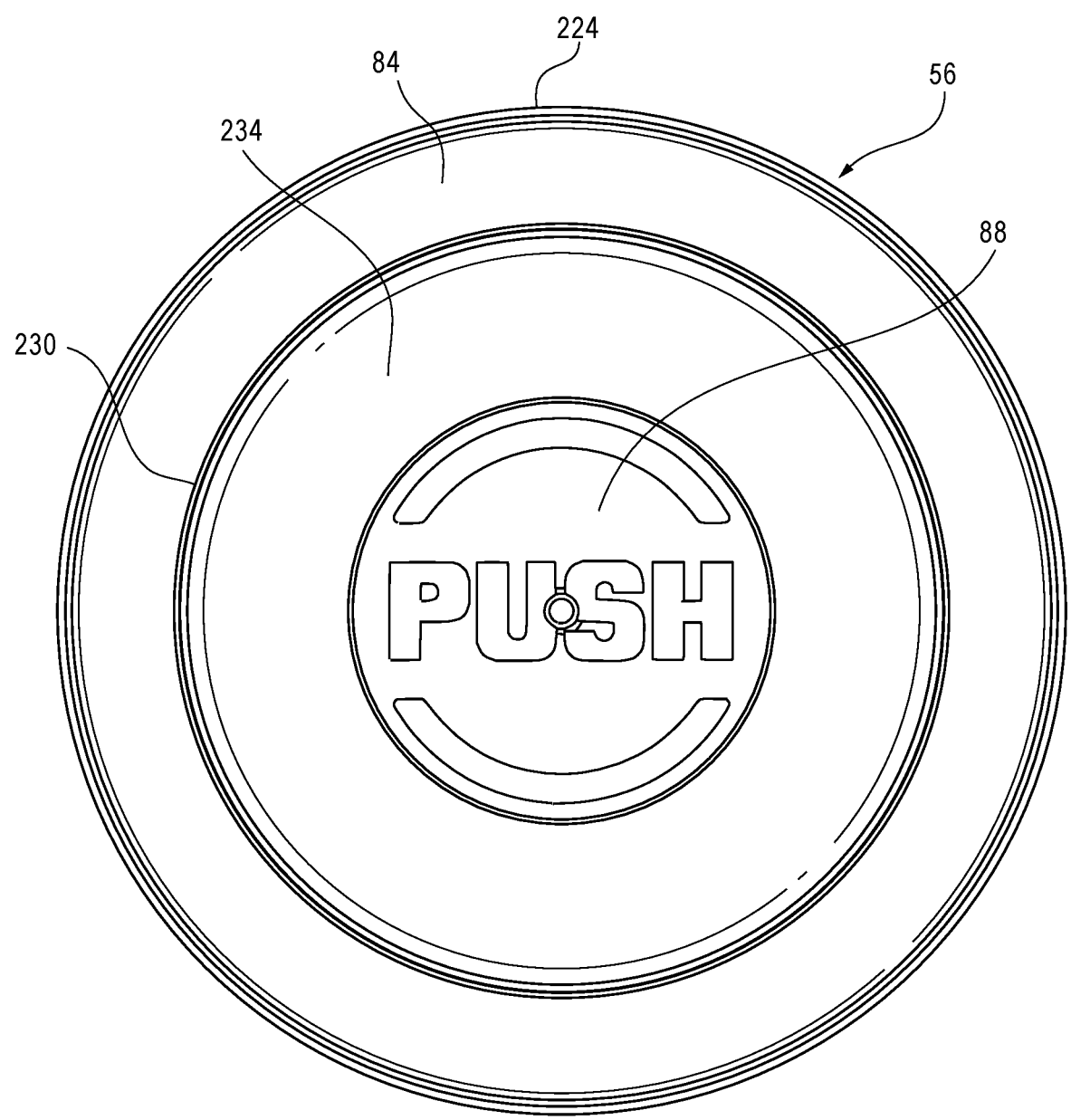
FIG. 6 is a top plan view of the lid of FIG. 4.
Figure 7:
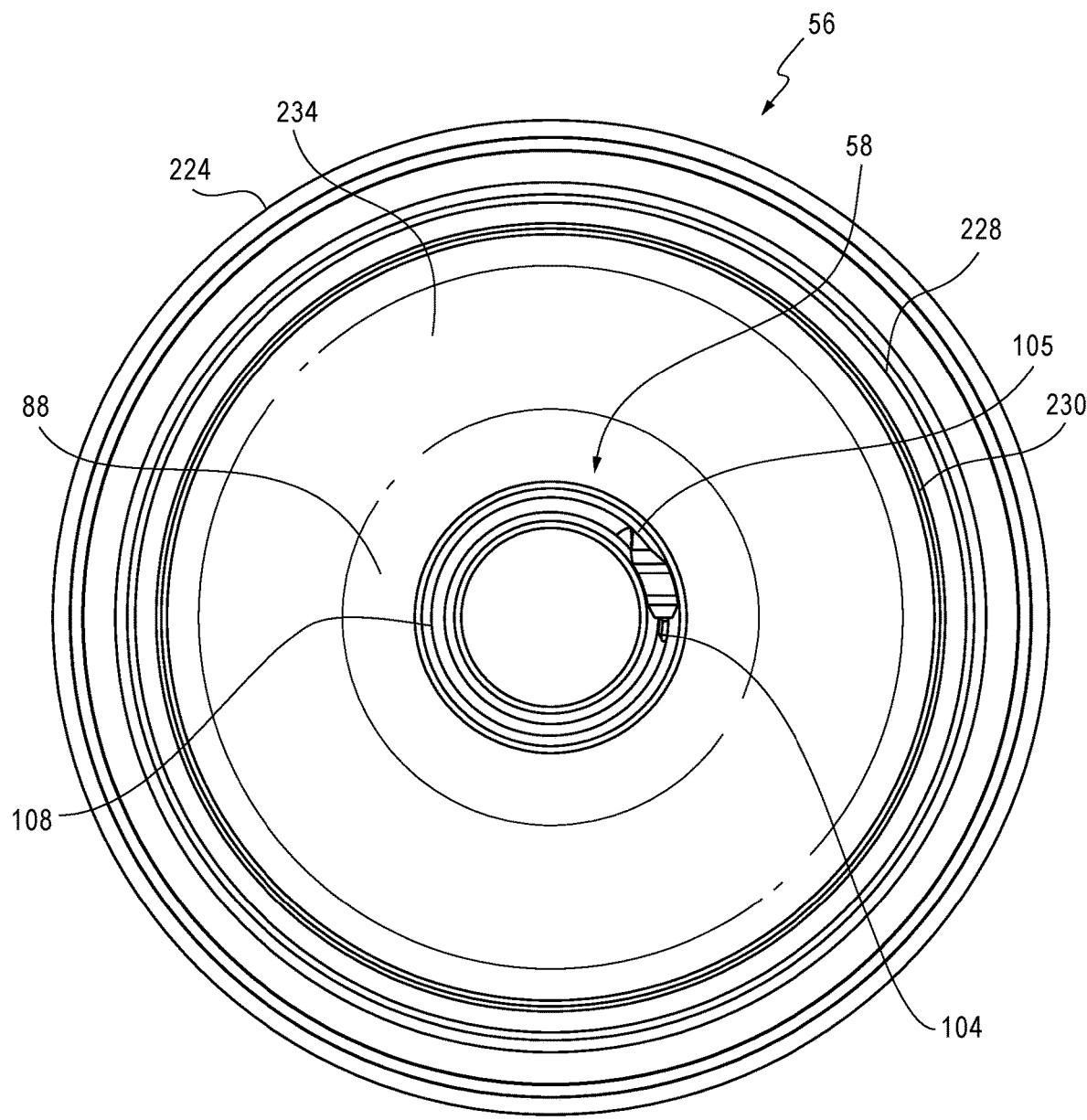
FIG. 7 is a bottom plan view of the lid of FIG. 4.

Referring now to FIGS. 3-5, the lid 56 preferably includes the post 58 as a unitary construction (i.e., a unitarily molded part), but it will be understood that one or more of the features or elements of the lid 56 and the post 58 may be separately formed or molded into an operative assembly. For example, the post 58 could be formed unitarily with the body 54 (not illustrated) in some applications. One advantage of such a configuration would be that the distal end of the post 58 does not need to pass through a substance stored within the body 54 when the lid 56 moves from its unactuated, first position to its actuated, second position to breach the sealed bottom end 70. This advantageously reduces the forces required for the post 58 to breach the sealed bottom end 70 of the body 54 and does not cause the distal end of the post 58 to mechanically crush or degrade the stored substance, which may rest between the distal end of the post 58 and the sealed bottom end 70, during the substance dispensing process.

Referring only to FIG. 3, the lid 56 includes a generally annular rim or peripheral portion 84 which defines a top end of the system 40 and which engages the body wall 64 when the lid 56 is assembled together with the body 54. The lid 56 includes a central press portion 88 that is recessed axially inwardly relative to the peripheral portion 84 of the lid 56. The post 58 has a proximal end that is connected to the underside of the lid 56 proximate to the press portion 88 and a distal end or leading edge 104 located in a confronting position with respect to the sealed bottom end 70 when the lid 56 is in its first (unactuated) position as illustrated in FIG. 3. The post 58 defines a helical wall 108 with a trailing edge 105 that is located axially outwardly (above) relative to the leading edge 104 of the post 58. As will be discussed in detail below, the leading edge 104 and trailing edge 105 are aligned with the frangible line 76 of the sealed bottom end 70 of the body 54, such that when the lid 56 is pressed into its actuated, second position by a user of the system 40, the leading edge 104 of the post 58 breaches the frangible line 76 of the sealed bottom end 70 of the body 54, followed by the trailing edge 105.

Still referring to FIG. 3, the body 54 and the lid 56 include a primary attachment means in the form of a laterally or radially inwardly extending annular bead 220 located on the body 54 and a laterally or radially outwardly extending flexible flange 224 located on the lid 56. The flexible flange 224 on the lid 56 is frustoconical and slopes radially inwardly in the direction away from the peripheral portion 84 of the lid 56. The flexible flange 224 locks beneath the bead 220 in the assembled, ready-to-dispense configuration of the system 40 illustrated in FIG. 3, whereby the flange 224 is positioned in the recessed space laterally between the outer wall 64 and the internal sealing wall 72, providing a separation that permits some distortion of the attachment means geometry without compromising the seal between the lid 56 and the body 54.

Referring now to FIGS. 3 and 5, the lid 56 includes a plug seal 228 for sealingly engaging the internal sealing wall 72 of the body 54. When viewed in a vertical cross-sectional plane containing the central axis 30 in FIG. 3, it can be seen that the lid 56 includes an axially-inwardly or downwardly extending wall 230 which connects to a convex, axially extending dome 234 that defines the central press portion 88. This configuration provides the lid 56 with a robust, spring-like, axial flexibility and permit the lid 56 to move from its unactuated, first position to its actuated, second position when a user presses against the press portion 88.

Figure 1:
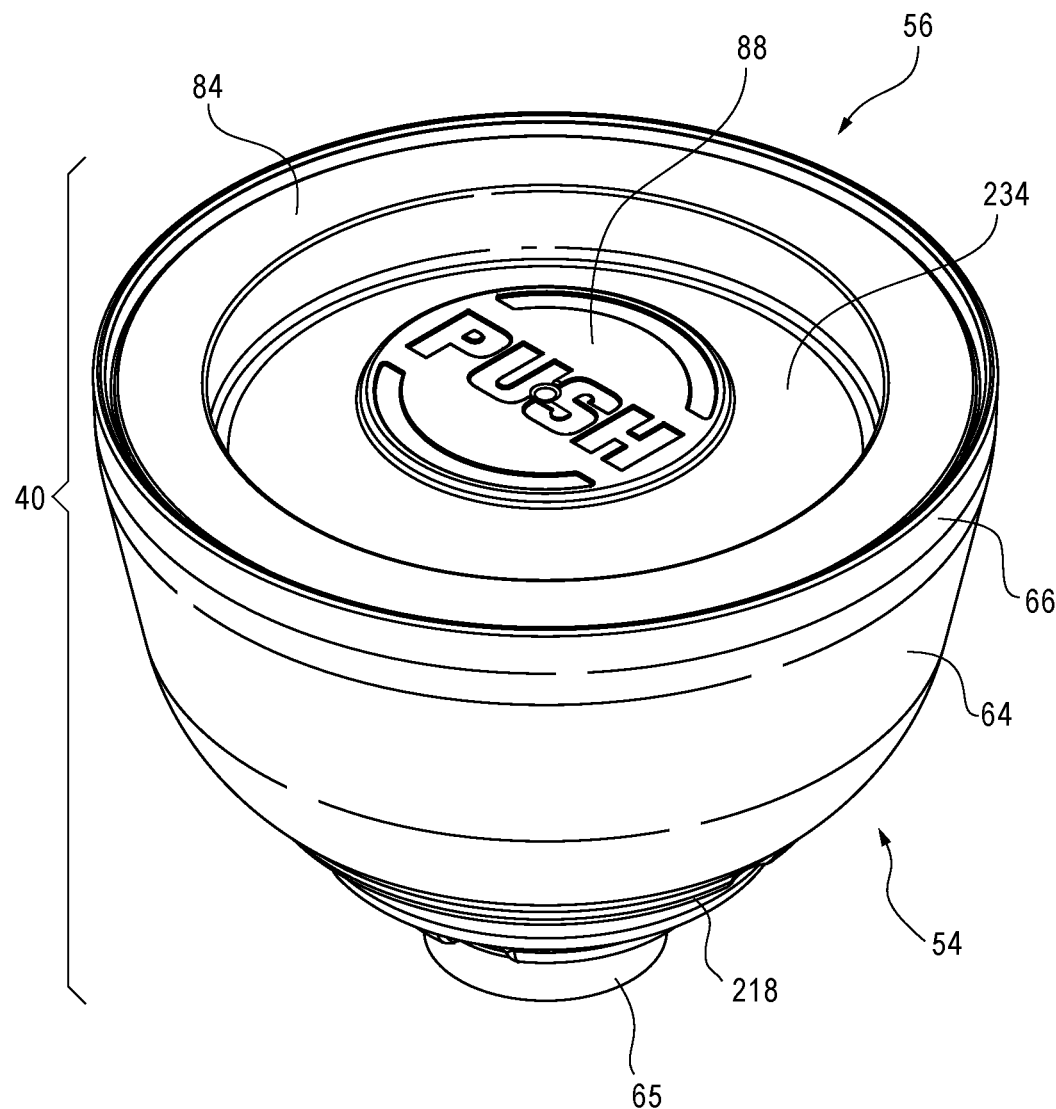
FIG. 1 is an isometric view from the front and above of a first embodiment of a dispensing system according to the invention for being actuated by a user to dispense a product into an open container or a target area.
Figure 2:
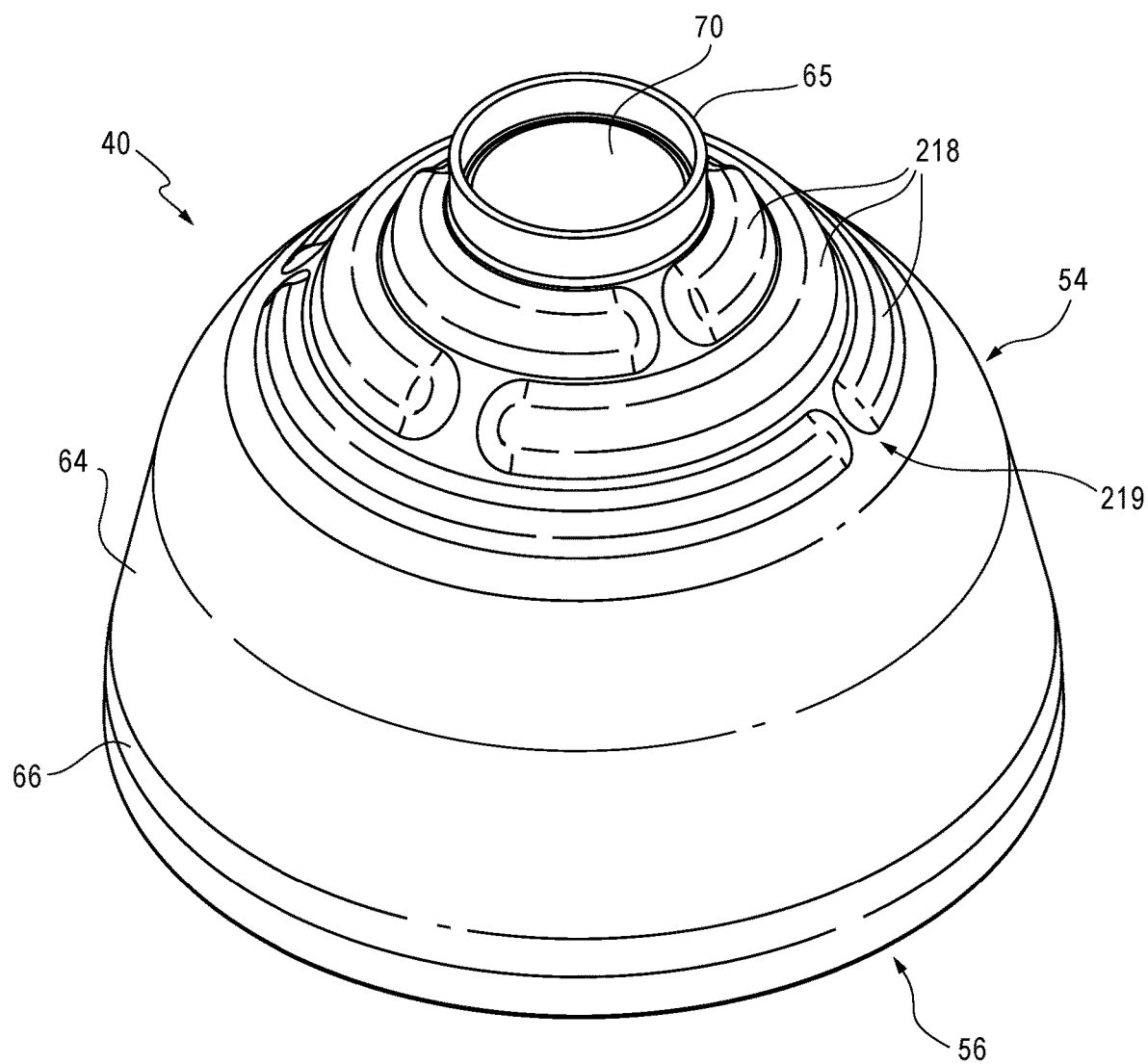
FIG. 2 is an isometric view, taken from the front and below, of the system of FIG. 1.

With reference now to FIGS. 2 and 11, the exterior surface of the outer wall 64 of the body 54 is provided with a plurality of bottle stop ribs, rings, or projections 218 for improved stability of the body 54 when mounted on the neck of a container 44, and this configuration resists tilting during dispensing. The projections 218 are arranged concentrically around the central axis 30 in three distinct sets of rings or regions. Each projection 218 has the form of an elongate, arcuate bead having a convex or somewhat semi-circular cross-sectional configuration (as seen in FIG. 3) and defines a leading end and a trailing end. The ends of adjacent projections 218 are arranged in a spaced-apart, confronting configuration to define a vent channel 219 therebetween. While the illustrated first embodiment of the system 40 has projections 218 that define the vent channel 219 between the leading and trailing ends of adjacent projections 218, it will be understood that the body 54 could be modified such that a single projection 218 could define the vent channel 219 by encircling the axis 30 such that its leading end confronts its trailing end (not illustrated).

Referring to FIG. 11, it can be seen that the arc length of the projections 218 in each concentric ring on the outer surface of the wall 64 increase with radial distance from the central axis 30 (not numbered, extending normal to the view plane in FIG. 11). Advantageously, the plurality of vent channels have offset angular locations from one another, relative to the central axis 30. Each vent channel 219 can be seen to have a generally saddle shaped surface configuration between the confronting ends of adjacent projections 218.

The inventors have found that providing the body 54 with a plurality of bottle stop projections 218 accommodate the placement of the sealed bottom end 70 atop a large variety of standard and non-standard containers with varying sizes of openings or neck finishes while minimizing the usage of plastic resin, the potential for vapor lock during dispensing, and/or the maximization of the usable internal volume for holding the substance to be dispensed. The channels 219 through each ring or region of projections 218 allows air to flow back into the package as product is evacuated out of the system interior. This eliminates or at least reduces the vacuum that can occur if an air path is not available. Furthermore, the user of the dispensing system 40 need not be educated about, or otherwise made aware of, the variability of container openings or neck finishes that exist on the market. The annular wall 65 extends around the sealed bottom end 70 to further assist in centering and maintaining the dispensing system 40 at the openings of some small opening containers. The projections 218 may further function as an anti-nesting feature when the manufacturer of the body 54 ships a plurality of this component to a filler or bottler that will fill the body 54 with a substance and attach the lid 56 atop the body 54, thus avoiding the prior art problem where cuplike bodies may become nested during shipping to a degree as to render them unfit or unusable for the filler or bottler that would separate the bodies prior to filling with a fluent substance.

One method of assembling the system 40 is next discussed. It will be understood that the method of assembly described herein is illustrative only, and there may be other methods of assembling the components of the system 40. The body 54 and the lid 56 are preferably molded as separate articles of manufacture and shipped to a filler facility. The filler facility then fills the body 54 with a pre-determined amount or dose of a substance (not illustrated). The plug seal 228 of the lid 56 is then placed into the interior of the top end 66 of the body into a sealing, frictional engagement with the internal sealing wall 72. The flexible, annular flange 224 of the lid 56 engages and deflects radially inwardly against the annular snap-fit bead 220 of the body 54 as the lid 56 and the body 54 are brought together in the axial direction and are mated into a substantially permanent connection. The flexible, annular flange 224 of the lid 56 then rebounds radially outwardly to lock beneath the annular snap-fit bead 220 of the body 54. The filled system 40 is thus provided to the consumer in the form a completed package.

The detailed operation and function of the system 40 will next be described. Typically, a user, such as a customer, will encounter the system 40 as shown, with the system 40 and the fluent substance contained and sealed therein defining a package.

With reference to FIG. 26, the system 40 would be typically used for dispensing a substance stored within the system 40, such as a powder, to be dissolved within a liquid (e.g., water) that is stored in a container 44. The user would first open the container 44 by removing the cap or closure (not shown). The user would then orient the system 40 in an upright manner atop the upright, opened container 44 such that the bottle stop projections 218 of the body 54 would rest against the container 44 at its opening. In this position, the sealed bottom end 70 of the body 54 is located at (e.g., above, within) the opening of the container 44. The bottle stop projections 218 help to orient the body 54 and lid 56 such that the post 58 is generally upright and extends along the central axis 30, and to minimize the chances of vapor lock between the system 40 and the container 44 when dispensing for improved flow of the stored substance.

The user can actuate the system 40 by gripping the body 54 and/or the container 44 and pressing with a thumb or finger against the press portion 88 on the lid 56. Application of a force upon the lid 56 will move the lid 56 from its resting, first position into its deflected, second position, and, in the process, drive down the post 58 along the axis 30. When a sufficient pre-determined force is applied to the press portion 88 to deflect it axially inwardly toward the container 44, the leading edge 104 of the post wall 108 will breach the sealed bottom end 70 of the body 54. More specifically, the frangible line 76 of the sealed bottom end 70 will rupture and tear. As the user continues to press the press portion 88 axially inwardly, the distal portion of the wall 108 contacts and tears the line 76 until the trailing edge 105 breaches the sealed bottom end 70. The radial separation of the leading edge 104 and the trailing edge 105 leaves a portion of the line 76 intact and permits one circular petal of material to open axially downwardly toward the container 44 interior. A dispensing orifice 80 is thus created between the post 58 and the opened petal to permit the fluent substance to exit the body 54 and enter the container 44.

It is contemplated that the one preferred form of the system 40 would be single-use, and the system 40 would be either recycled, or appropriately discarded, by the user after a single actuation or use. More preferably, all components of the system 40 would be formed form the same classification of plastic for single stream recycling.

The user would typically close the container 44 with the original closure cap or lid (not illustrated) and then shake the closed container 44 to mix the dispensed substance together with the liquid of the container 44, and such a mixture would be consumed or otherwise used by the user.

Figure 12:
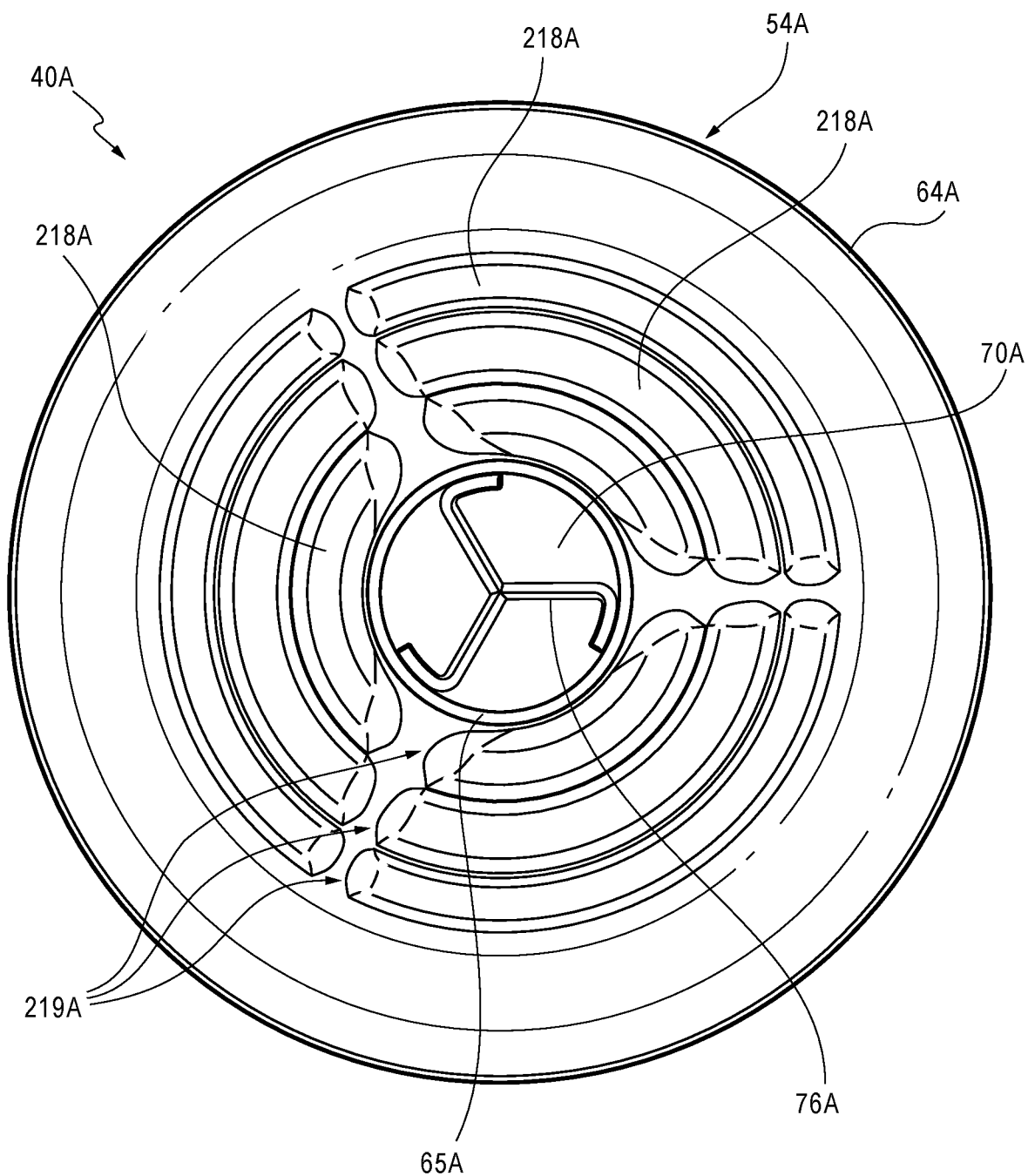
FIG. 12 is a bottom plan view of a second embodiment of a dispensing system according to the invention for being actuated by a user to dispense a product into an open container or a target area.
Figure 13:
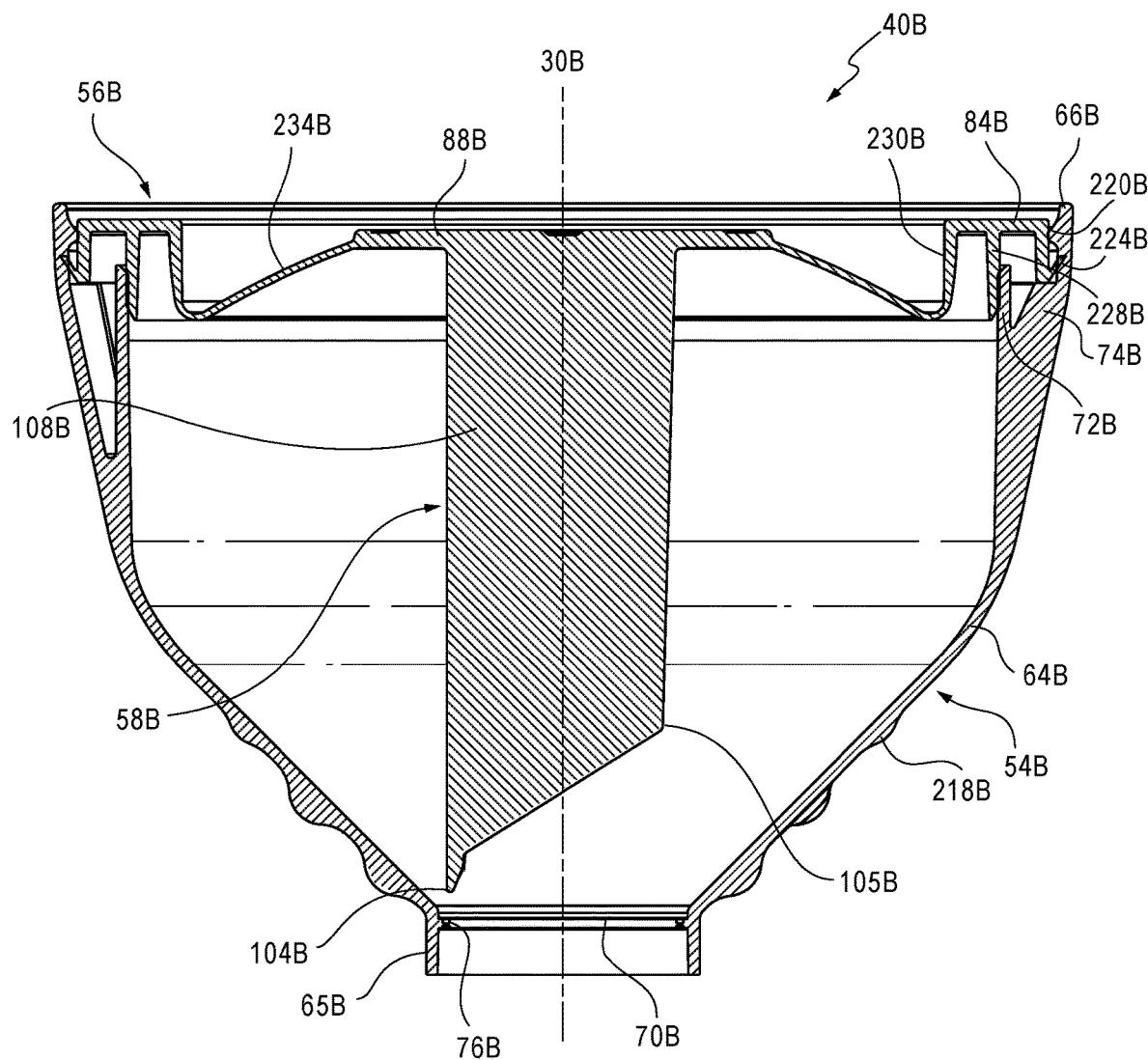
FIG. 13 is a cross-sectional view of a third embodiment of a dispensing system according to the invention, taken in a vertical cross-sectional plane containing a central axis of the system.

A second embodiment of a system 40A according to the present invention is illustrated in FIG. 12, which has a unique venting interface between the body 54A and the opening of the container (not illustrated in FIG. 12) among other features. Like elements between the first illustrated embodiment of the system 40 and the second illustrated embodiment of the system 40A are designated with the same numeral (the first embodiment numbered features having no suffix and the second embodiment having numbered features with an "A" suffix). The second illustrated embodiment of the system 40A has the same basic elements as the first illustrated embodiment of the system 40, namely a body 54A, a flexible lid 56A, and a post (not visible in FIG. 12) connected to one of the body 54A or the lid 56A for being moved axially into and through a sealed bottom end 70A of the body 54A to establish a flow path for a substance moving out of the interior of the system 40A. It will be understood that the features of the system 40A that are not visible in FIG. 12 are identical to that of the system 40 described above.

Still referring to FIG. 12, the second illustrated embodiment of the system 40A differs from the first illustrated embodiment of the system 40 in that the vent channels 219A extending between successively larger bottle stop ribs, rings, or projections 218A are aligned at the same angular location relative to the central axis (not numbered in FIG. 12, extending transverse to the view plane). The vent channels 219A within a given diameter or radial spacing from the central axis are spaced approximately 120 degrees apart. Furthermore, the vent channels 219A extending between successively greater distances from the central axis decrease in width or arc length. In other forms of the present invention, not illustrated, the body 54A may be provided with a greater number of aligned vent channels 219A (spaced less than 120 degrees apart about the central axis) or a lesser number of aligned vent channels 219A (spaced more than 120 degrees apart).

Again, referring to FIG. 12, the second illustrated embodiment of the system 40A further differs from the first illustrated embodiment of the system 40 in that the sealed bottom end 70A includes a frangible region of material in the form of three reduced-thickness intersecting lines or J-shaped line-like features 76A that are integrally molded with the body 54A to define lines of preferential weakness. Three petals or flaps of material extend between the intersecting lines 76A, which converge at a point through which the central axis extends. As will be discussed in greater detail hereinafter, the J-shaped intersecting lines 76A are configured to rupture when engaged by a pointed, star-shaped post (not visible in FIG. 12, but see FIG. 19), which causes the petals to open axially downward. Opening of the petals defines a dispensing orifice in the bottom of the body 54A to permit flow of a substance from the interior of the body 54A to the exterior of the body 54A.

The inventors of the present invention have found that molding the sealed bottom end 70A with the J-shaped lines 76A to define a frangible region or portion of the body 54A may provide improved actuation of the system 40A compared to prior art systems, and further advantageously eliminates the need for a secondary, separate seal that may otherwise be required to cover a body having an open-molded bottom end. This may reduce the cost of manufacture and/or assembly of the system 40A, and further may increase the robustness of the system 40A, after it has been assembled and filled with a product, as well as during shipping, handling, and/or storage thereof.

A third embodiment of a system 40B according to the present invention is illustrated in FIGS. 13-16, which has a unique opening means. Like elements between the first illustrated embodiment of the system 40 and the third illustrated embodiment of the system 40B are designated with the same numeral (the first embodiment numbered features having no suffix and the third embodiment numbered features having a "B" suffix). The third illustrated embodiment of the system 40B has the same basic elements as the first illustrated embodiment of the system 40, namely a body 54B, a flexible lid 56B, and a post 58B connected to the lid 56B for being moved axially into and through a sealed bottom end 70B of the body 54B to establish a flow path for a substance to move out of the interior of the system 40B.

Figure 14:
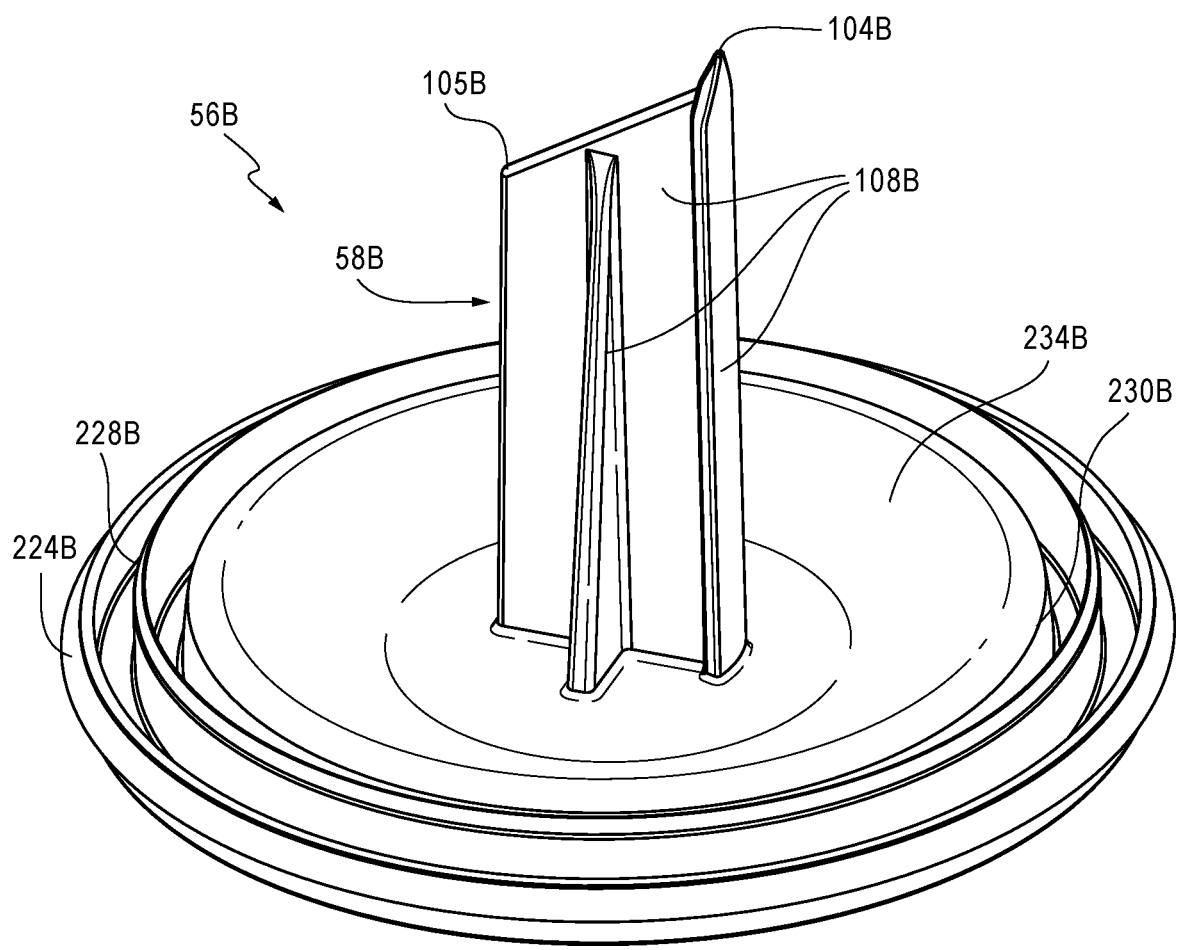
FIG. 14 is an isometric view from the front and below of only the lid of the system of FIG. 13.
Figure 15:
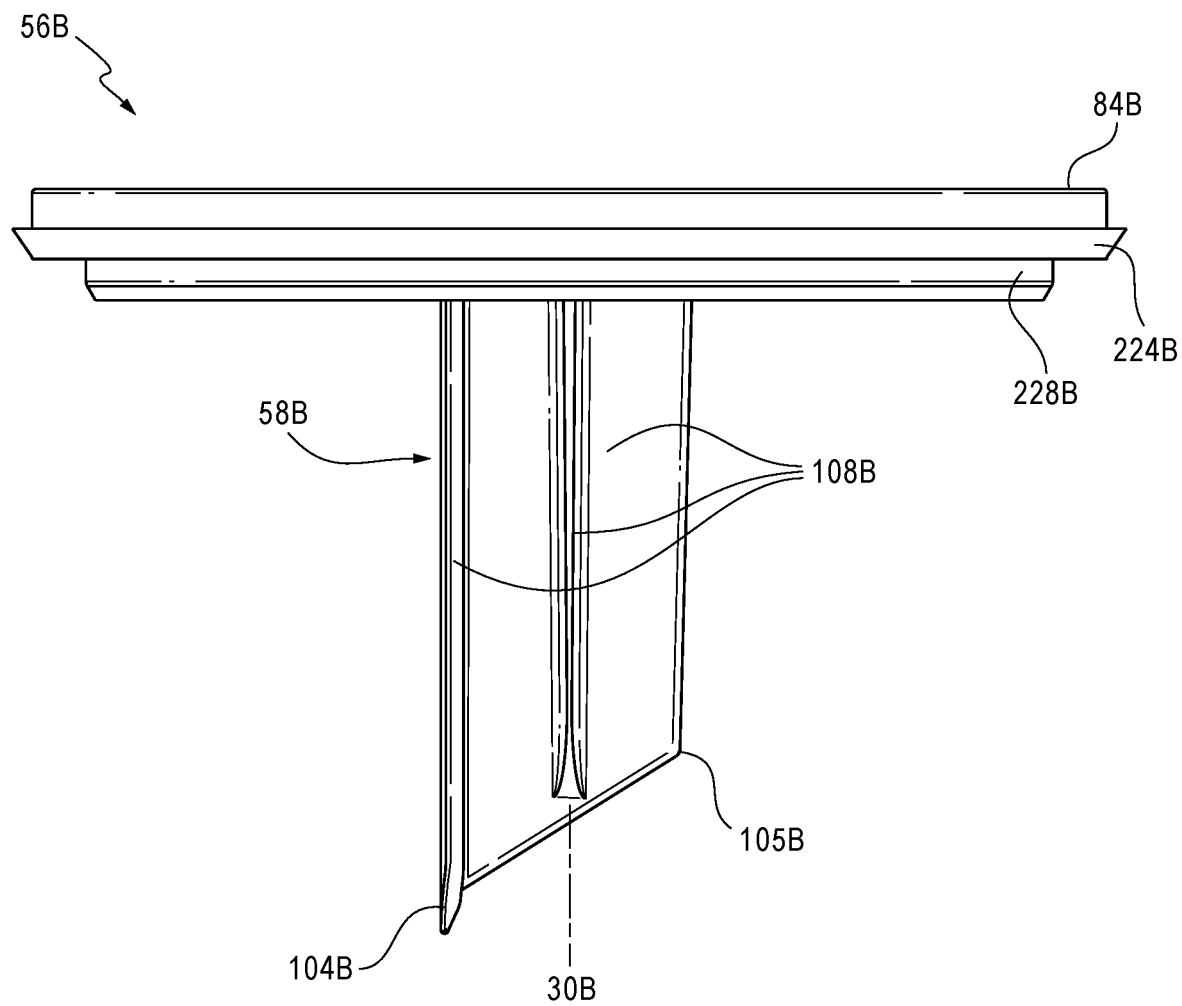
FIG. 15 is a right-side elevation view of the lid of FIG. 13.
Figure 16:
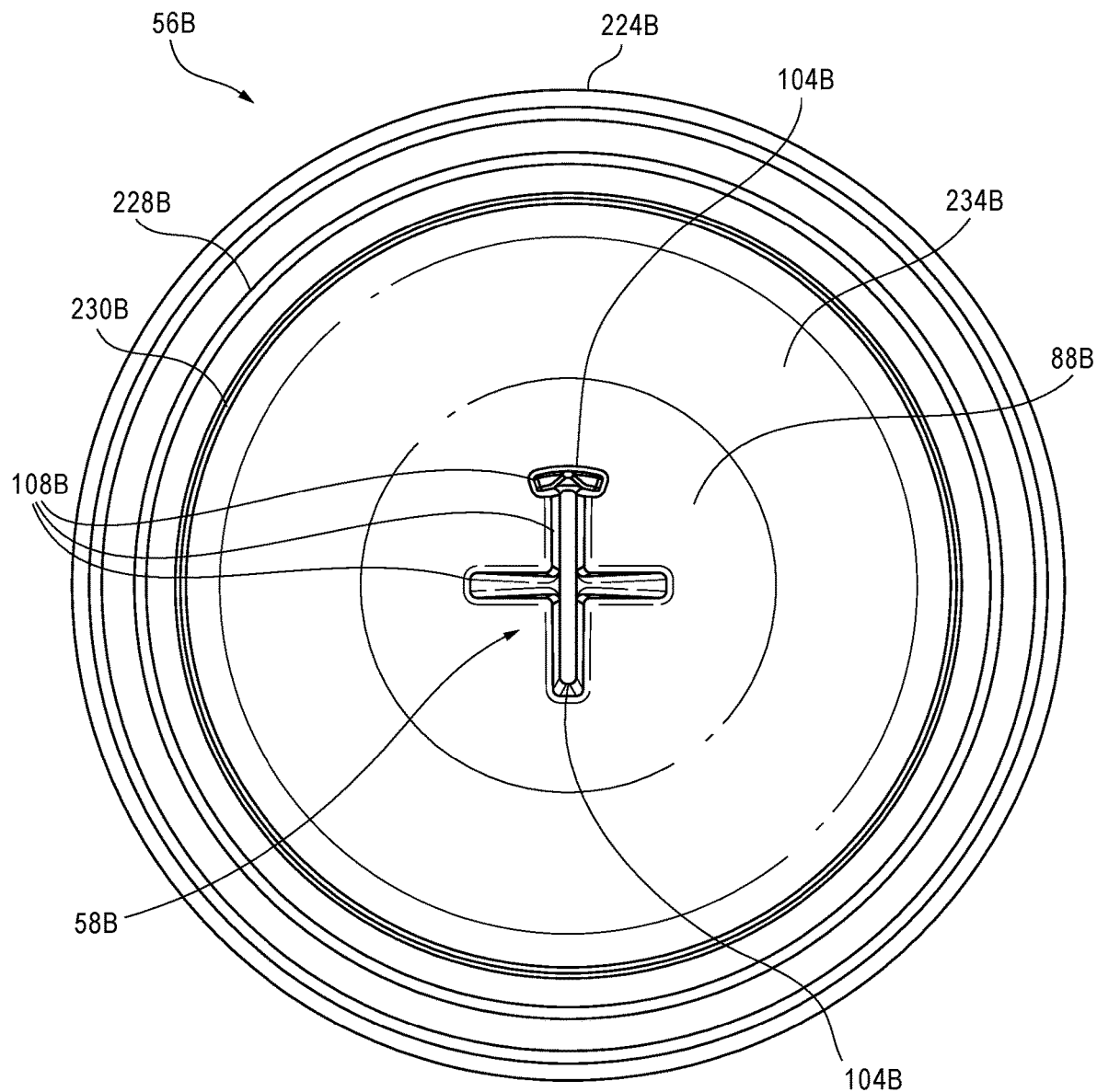
FIG. 16 is a bottom plan view of the lid of FIG. 13.
Figure 17:
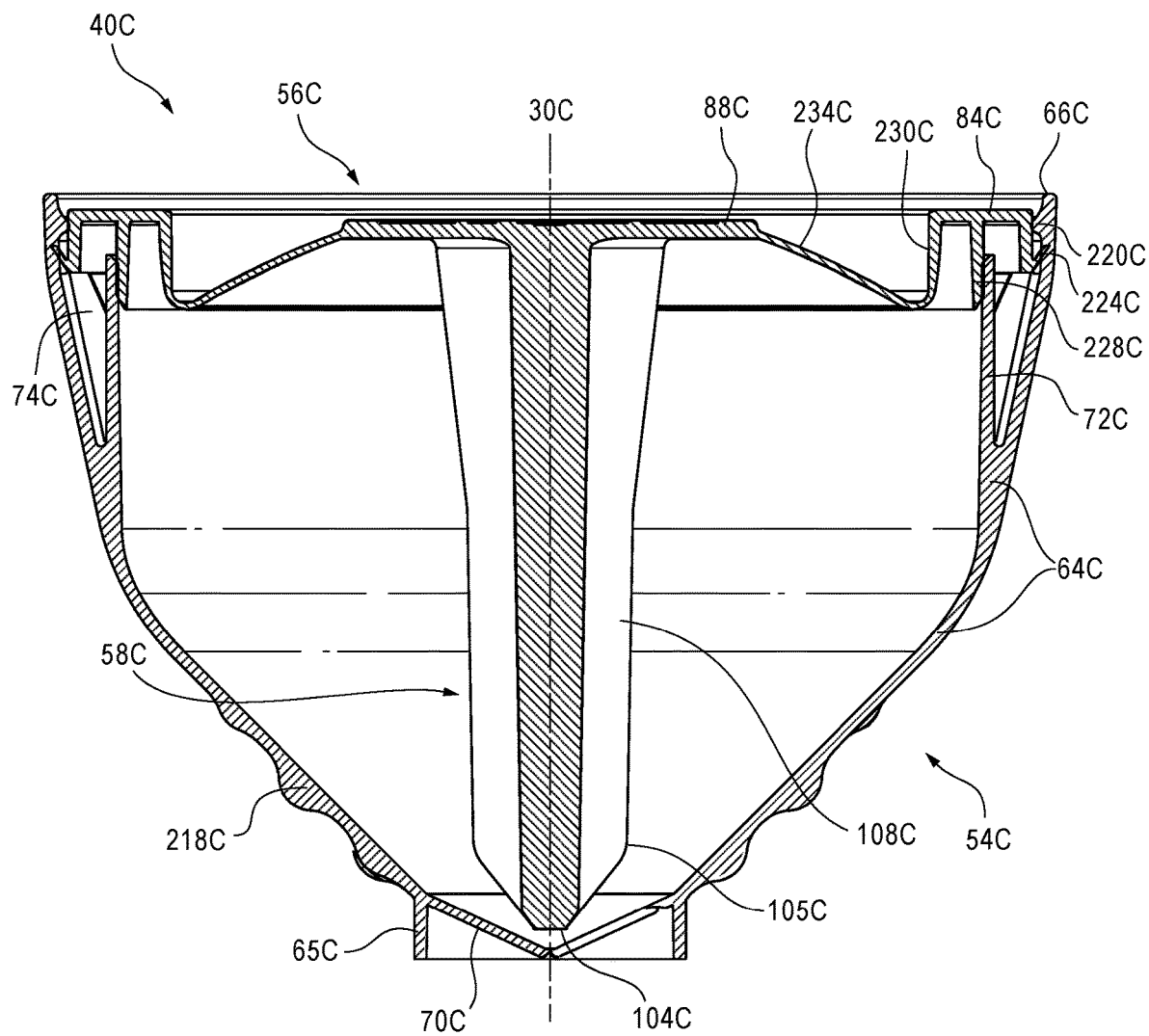
FIG. 17 is a cross-sectional view of a fourth embodiment of a dispensing system according to the invention, taken in a vertical cross-sectional plane containing a central axis of the system.
Figure 18:
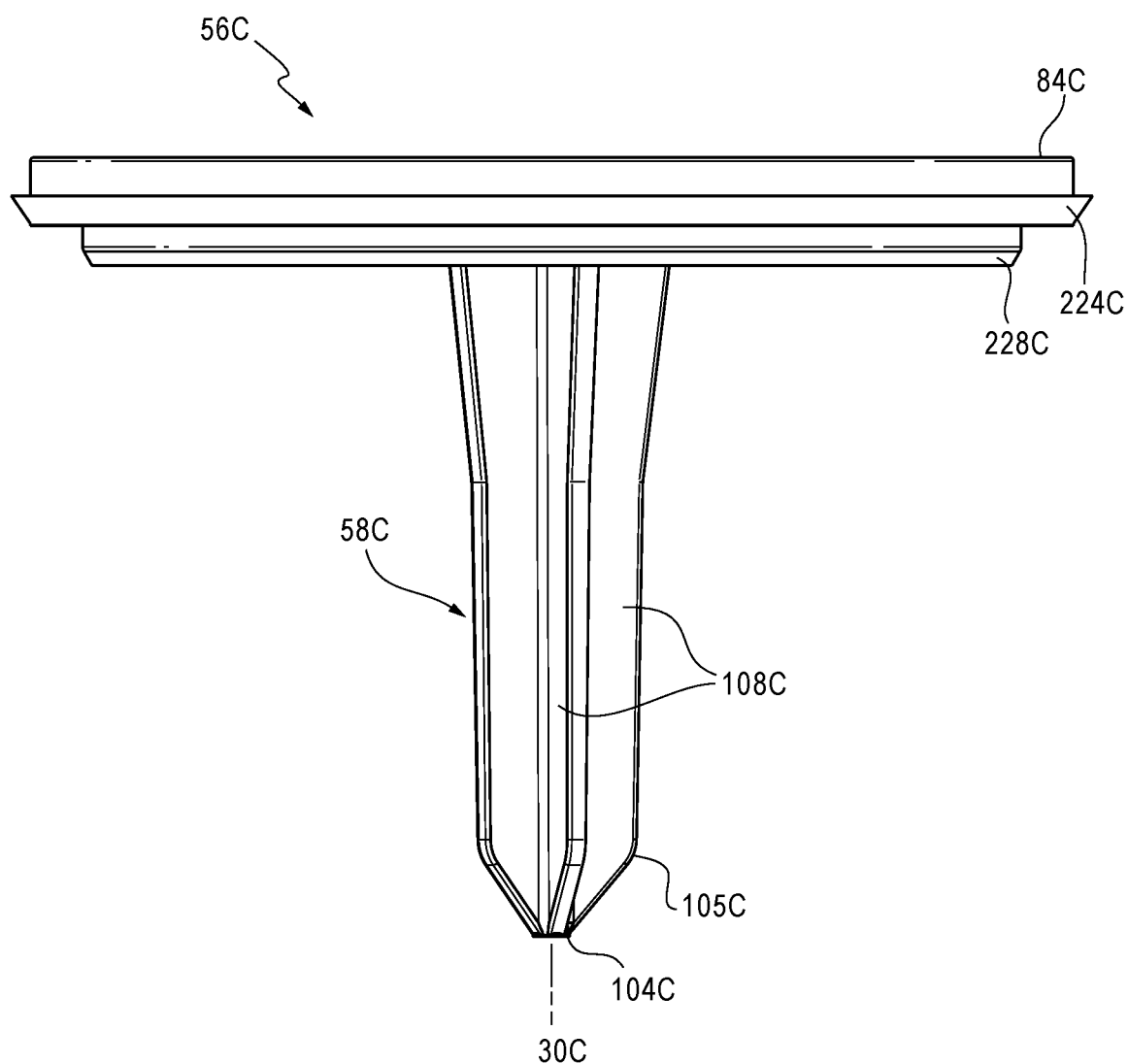
FIG. 18 is a right-side elevation view of only the lid of the system of FIG. 17.

With reference to FIGS. 14-16, the third illustrated embodiment of the system 40B differs from the first illustrated embodiment of the system 40 in that the post 58B has a different configuration for engaging the sealed bottom end 70B of the body 54B. Specifically, the post 58B includes a plurality of intersecting walls 108B to establish a generally cross-shaped configuration. One of the axially extending walls 108B defines a leading edge 104B that functions to concentrate force to initiate a rupture in the line 76B (FIG. 13 only) of weakened material in the form of a circle extending around the periphery of the sealed bottom end 70B. Another one of the axially extending walls 108B defines a trailing edge 105B such that the post 58B functions to propagate a tear along the ruptured line 76B to establish a dispensing orifice (not illustrated). Additional lateral walls 108B function to stabilize and stiffen the post 58B during use, but do not contact the bottom end 70B. A circular petal of material from the breached bottom end 70B remains attached to the remainder of the body 54B.

The inventors of the present invention have found that the configuration of the post 58B is especially suited for use with a body 54B having a sealed bottom end 70B with an annular line 76B and may advantageously eliminate the need for a secondary, separate seal that may otherwise be required to cover a body having an open-molded bottom end. This may reduce the cost of manufacture and/or assembly of the system 40B in comparison to prior art devices, and further may increase the robustness of the system 40B, after it has been assembled and filled with a product, as well as during shipping, handling, and/or storage thereof. The improved configuration of the post 58B may further reduce the force required of the user to open the system 40B to establish a dispensing orifice in the sealed bottom end 70B.

A fourth embodiment of a system 40C according to the present invention is illustrated in FIGS. 17-21, which has a unique opening means. Like elements between the first illustrated embodiment of the system 40 and the fourth illustrated embodiment of the system 40C are designated with the same numeral (the first embodiment numbered features having no suffix and the fourth embodiment numbered features having a "C" suffix). The fourth illustrated embodiment of the system 40C has the same basic elements as the first illustrated embodiment of the system 40, namely a body 54C, a flexible lid 56C, and a post 58C connected to the lid 56C for being moved axially into and through a sealed bottom end 70C of the body 54C to establish a flow path for a substance moving out of the interior of the system 40C.

Figure 19:
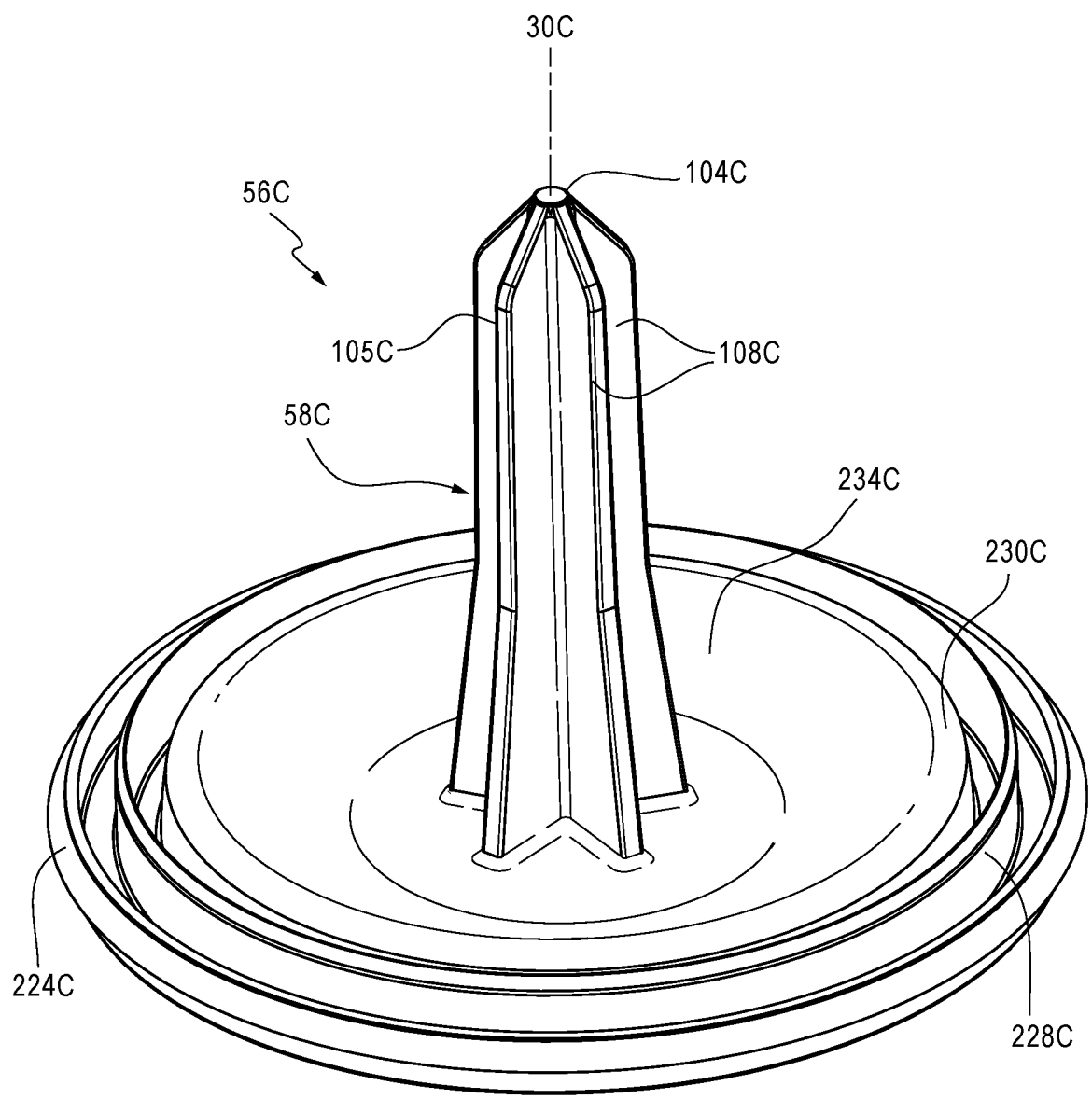
FIG. 19 is an isometric view from the rear and below of the lid of FIG. 18.
Figure 20:
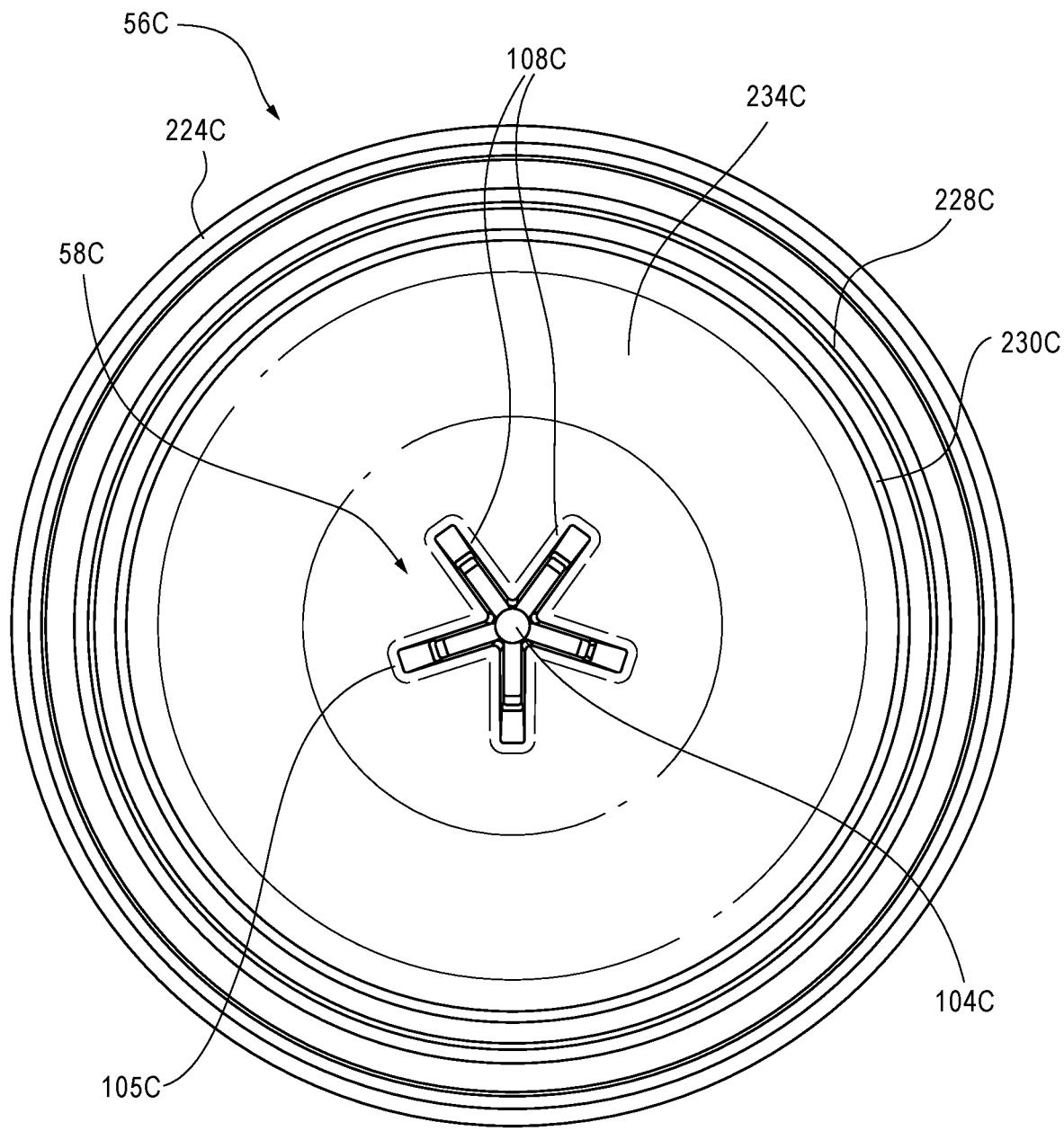
FIG. 20 is a bottom plan view of the lid of FIG. 18.
Figure 21:
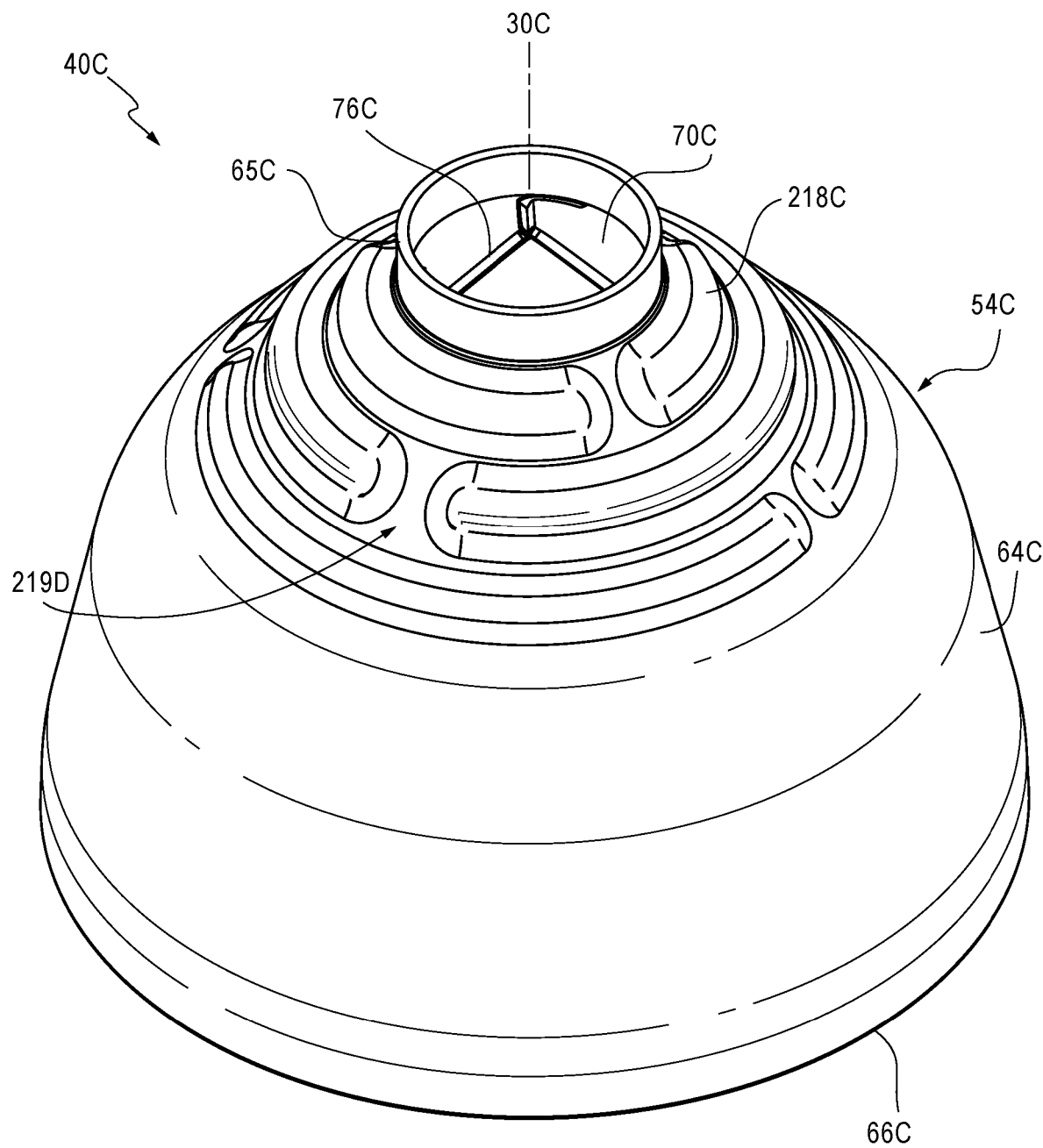
FIG. 21 is an isometric view from the rear and below of only the base of the system of FIG. 17.

With reference to FIGS. 19 and 20, the fourth illustrated embodiment of the system 40C differs from the first illustrated embodiment of the system 40 in that the post 58C has a different configuration for engaging a modified, conical sealed bottom end 70C of the body 54C. Specifically, the post 58C includes a five intersecting walls 108C radiating from the central axis 30C (FIGS. 17 and 19) of the system 40C to establish a generally star-shaped configuration. The axially extending walls 108C define a leading edge 104C that functions to concentrate force to initiate a rupture in the hook or J-shaped lines 76C (FIG. 21) of weakened material in the sealed bottom end 70C. Each wall 108C defines a trailing edge 105C such that the post 58C functions to propagate a tear along the ruptured lines 76C to establish a dispensing orifice (not illustrated). Rupture of the sealed end 70C forms three petals of material that remain attached to the remainder of the body 54C. The walls 108C of the post 58C are aligned with the sealed bottom end 70C to press against the petals in between the lines 76C urge the petals open to form the dispensing orifice.

The inventors of the present invention have found that the configuration of the post 58C is especially suited for use with a body 54C having a conical, axially-inwardly extending sealed bottom end 70C with the intersecting, J-shaped weakened lines 76C and may advantageously eliminate the need for a secondary, separate seal that may otherwise be required to cover a body having an open-molded bottom end. This may reduce the cost of manufacture and/or assembly of the system 40C in comparison to prior art devices, and further may increase the robustness of the system 40C, after it has been assembled and filled with a product, as well as during shipping, handling, and/or storage thereof. The configuration of the post 58C may further reduce the force required of the user to open the system 40C to establish a dispensing orifice in the sealed bottom end 70C.

A fifth embodiment of a system 40D according to the present invention is illustrated in FIGS. 22-25, which has another unique opening means. Like elements between the first illustrated embodiment of the system 40 and the fifth illustrated embodiment of the system 40D are designated with the same numeral (the first embodiment numbered features having no suffix and the fifth embodiment numbered features having a "D" suffix). The fifth illustrated embodiment of the system 40D has the same basic elements as the first illustrated embodiment of the system 40, namely a body 54D, a flexible lid 56D, and a post 58D connected to the lid 56D for being moved axially into and through a sealed bottom end 70D of the body 54D to establish a flow path for a substance moving out of the interior of the system 40D.

Figure 24:
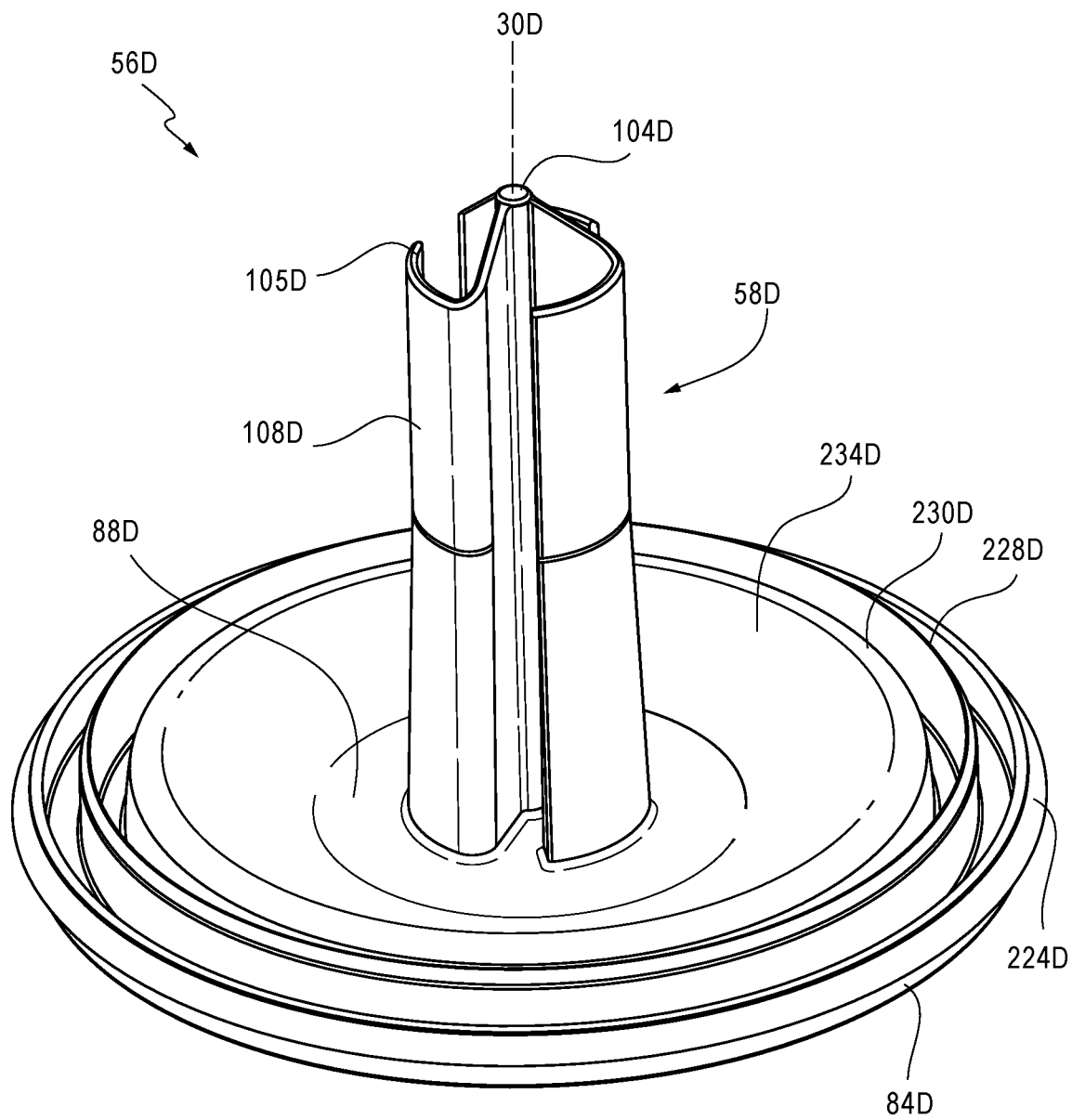
FIG. 24 is an isometric view from the rear and below of just the lid of the system of FIG. 22.
Figure 25:
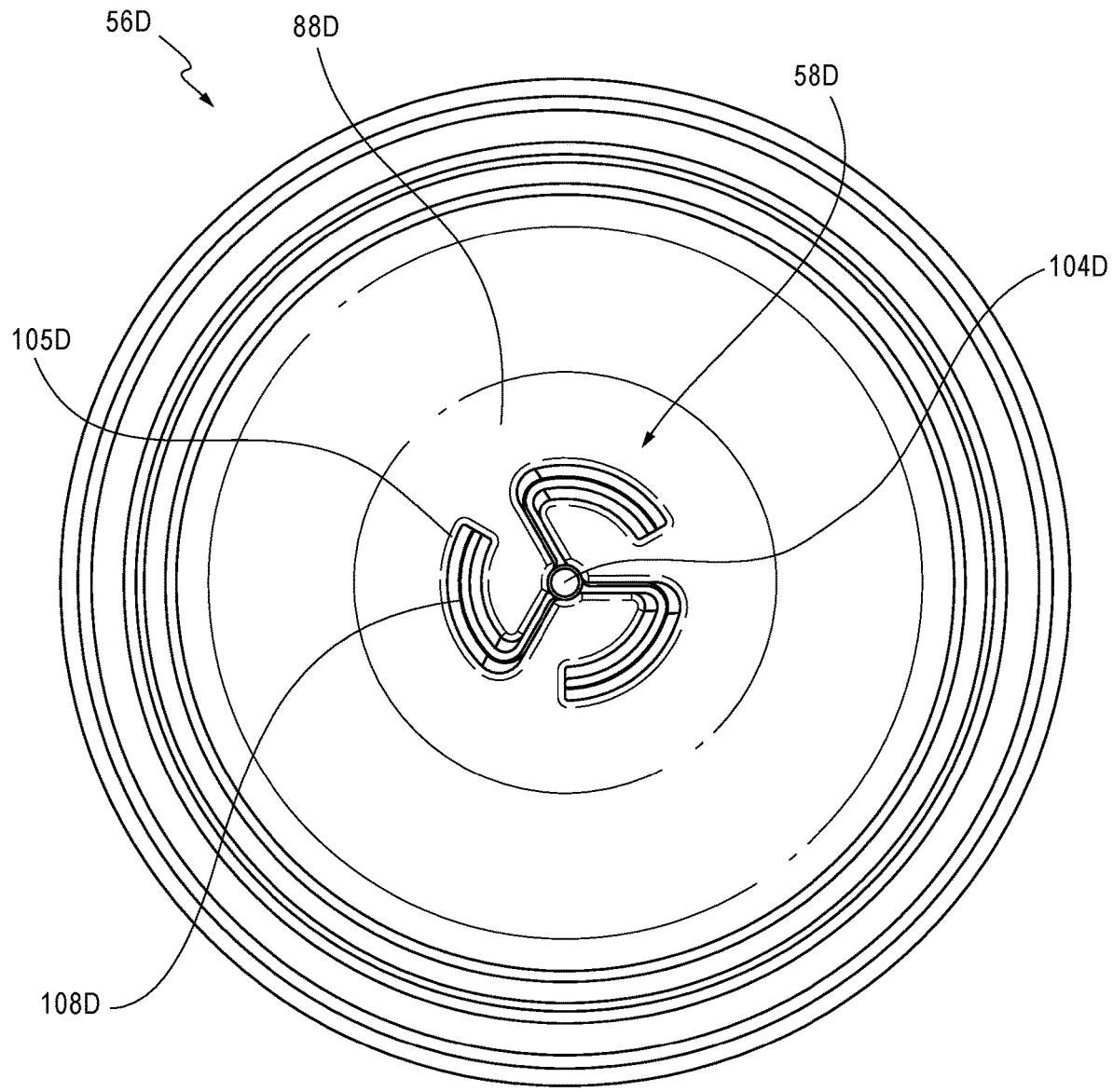
FIG. 25 is a bottom plan view of the lid of FIG. 24.

With reference to FIGS. 24 and 25, the fifth illustrated embodiment of the system 40D differs from the first illustrated embodiment of the system 40 in that the post 58D has a different configuration for engaging a modified, conical sealed bottom end 70D (FIG. 22) of the body 54D. Specifically, the post 58D includes three hook-like intersecting walls 108D radiating outwardly from the central axis 30D of the system 40D. The axially extending walls 108D define a leading edge 104D proximate to the central axis 30D that functions to concentrate force to initiate a rupture in the sealed bottom end 70D when the system 40D is actuated by a user. Each wall 108D defines a trailing edge 105D such that the post 58D functions to propagate a tear along the ruptured portions of the sealed bottom end 70D to establish a dispensing orifice (not illustrated).

Figure 22:
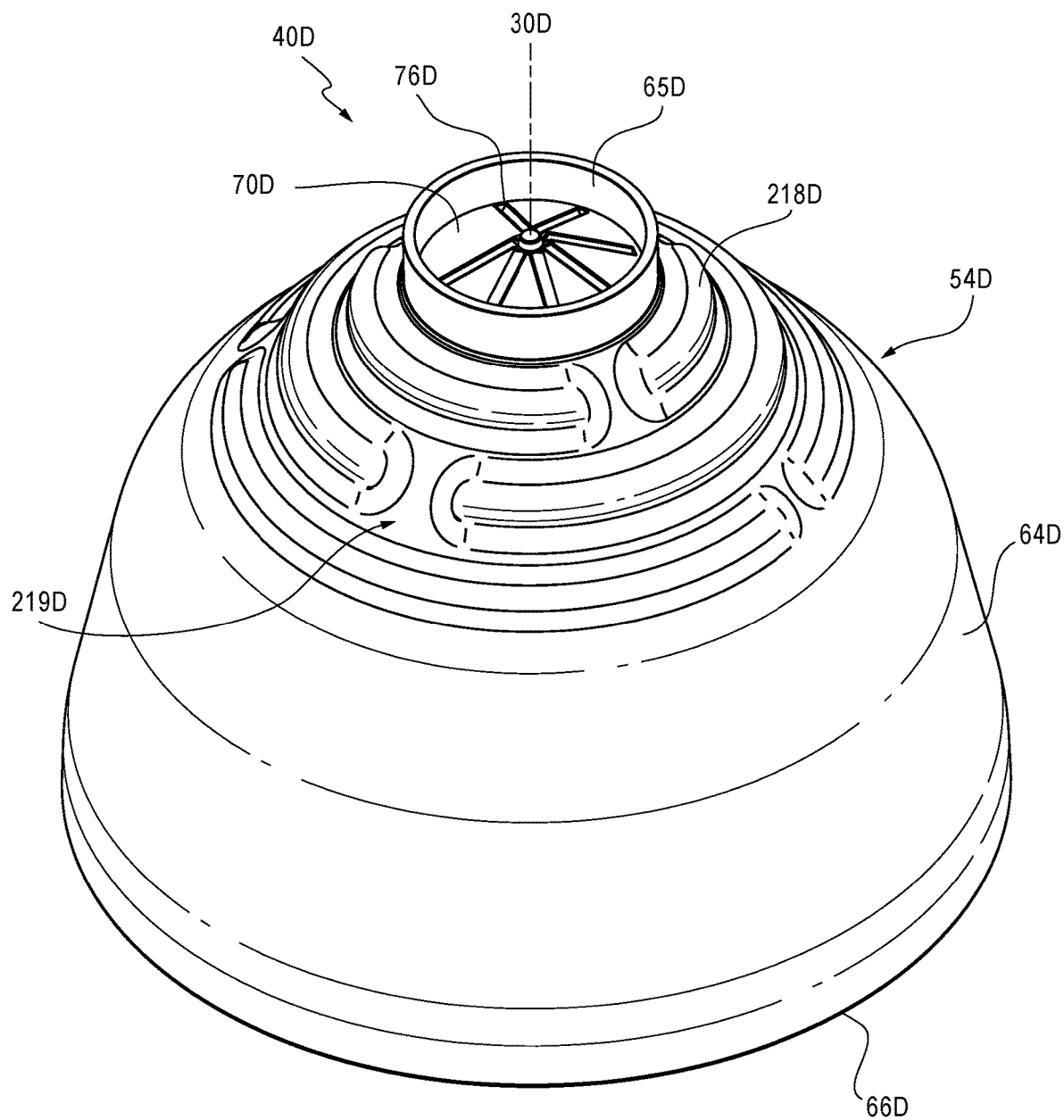
FIG. 22 is an isometric view from the rear and below of a fifth embodiment of a dispensing system according to the invention.
Figure 23:
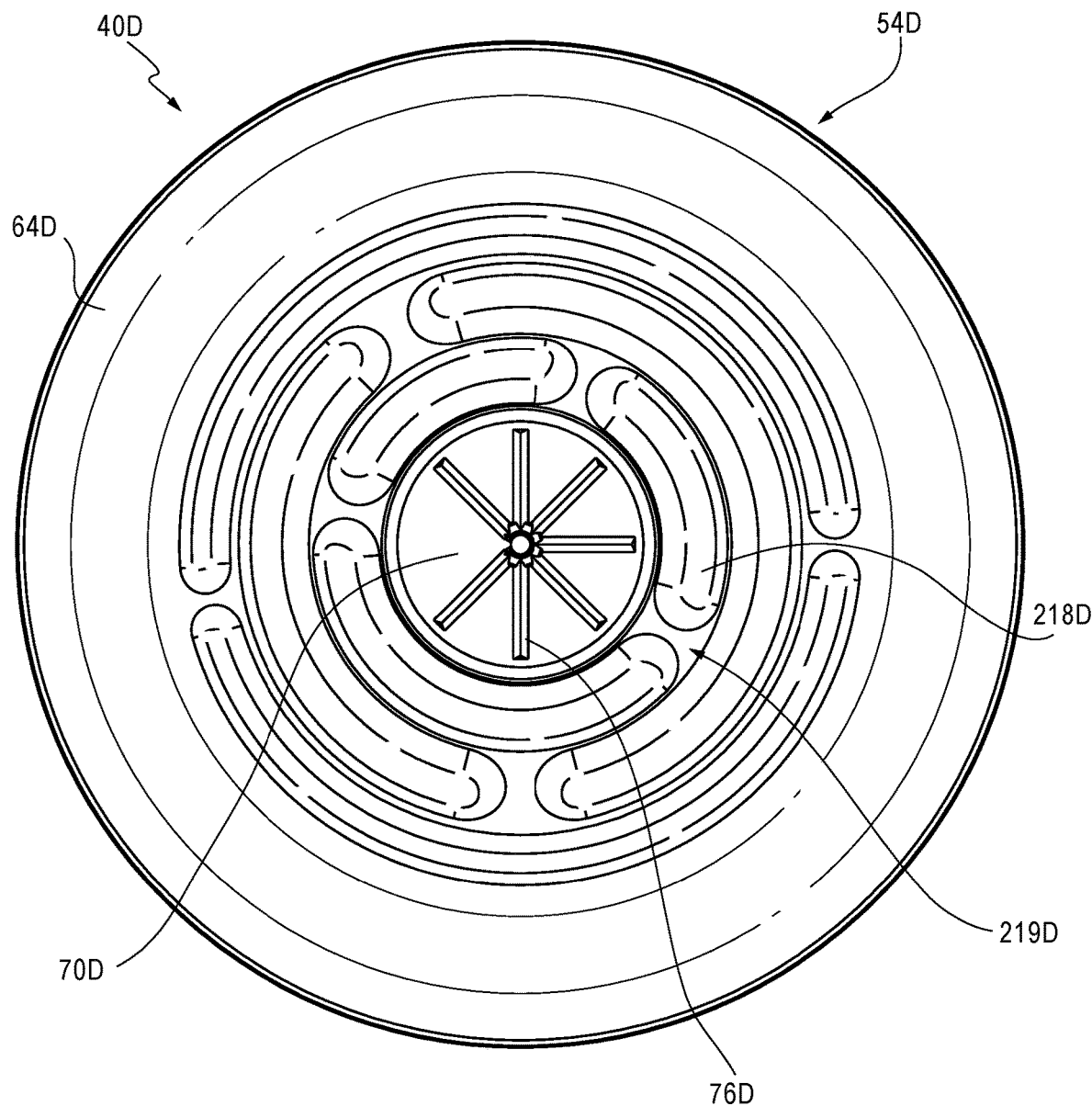
FIG. 23 is a bottom plan view of the system of FIG. 22.

With reference to FIGS. 22 and 23, the sealed end 70D of the body 54D includes a plurality of spoke-like lines of weakened material 76D radiating outwardly from the central axis 30D (visible in FIG. 22). The hook-like walls 108D of the post 58 are designed to puncture the center of the sealed bottom end 70D, forming seven petals of material that remain attached to the remainder of the body 54D. The hook-like walls 108D of the post 58D press against multiple petals in between the lines 76D urge the petals open to form the dispensing orifice.

The inventors of the present invention have found that the configuration of the post 58D is especially suited for use with a body 54D having a sealed bottom end 70D with the radiating weakened lines of material 76D and may advantageously eliminate the need for a secondary, separate seal that may otherwise be required to cover a body having an open-molded bottom end. This may reduce the cost of manufacture and/or assembly of the system 40D in comparison to prior art devices, and further may increase the robustness of the system 40D, after it has been assembled and filled with a product, as well as during shipping, handling, and/or storage thereof. The configuration of the post 58D may further reduce the force required of the user to open the system 40D to establish a dispensing orifice in the sealed bottom end 70D.

It will be understood that various features of the system 40, 40A, 40B, 40C, 40D may be combined.

For example, in one broad form of the invention, the outer surface of the body wall may be provided with one or more bottle stop projections, with any of the above-discussed post and sealed bottom end configurations.

As another example, in one broad form of the invention, any of the above-discussed post and sealed bottom end configurations may be used with a body having no bottle stop projections.

As a further example, in one broad form of the invention, the lid may include a radially-outward, annular portion defining a top end and the press portion is located at a recessed position axially inwardly of the annular portion in the unactuated, first position of the system—and this feature may be provided with or without or more bottle stop projections on the body, and with or without any of the above-discussed post and sealed bottom end configurations.

In yet another example, in one broad form of the invention, the lid may include at least one laterally outwardly extending flexible frustoconical flange for securing the lid with the body—and this feature may be provided with or without or more bottle stop projections on the body, and with or without any of the above-discussed post and sealed bottom end configurations.

Other configurations of the present invention are set forth in the claims.

Various modifications and alterations to this invention will become apparent to those skilled in the art without departing from the scope and spirit of this invention. Illustrative embodiments and examples of the system are provided as examples only and are not intended to limit the scope of the present invention.

What is claimed is:

1. A dispensing system for use in dispensing a substance that may be stored within said system, said system comprising:
    a body having an outer wall defining an internal volume for storing a substance, said outer wall having an open top end and a sealed bottom end;
    a flexible lid that is connected to said body to cover said open top end, said lid having a press portion for being engaged by a user of said system, said lid having a first position and a second position moved relative to said first position, wherein in said second position at least a portion of said lid is deflected toward said sealed bottom end of said body;
    a post connected to said lid, said post configured in said second position of said lid to breach said sealed bottom end of said body to form a dispensing orifice to accommodate movement of a substance out of said body; and
    wherein an exterior surface of said outer wall includes at least one bottle stop projection extending therefrom.

2. The dispensing system of claim 1 wherein said exterior surface of said outer wall includes a plurality of said bottle stop projections arranged concentrically around a central axis of said system.

3. The dispensing system of claim 1 wherein said at least one bottle stop projection is an elongate, arcuate bead extending around a central axis of said system.

4. The dispensing system of claim 1 wherein said at least one bottle stop projection defines a leading end and a trailing end in a spaced-apart, confronting configuration to define at least one vent channel therebetween.

5. The dispensing system of claim 4 wherein said exterior surface of said outer wall includes a plurality of said bottle stop projections arranged concentrically around a central axis of said system and defining a plurality of said vent channels.

6. The dispensing system of claim 5 wherein said plurality of said vent channels have offset angular locations relative to said central axis.

7. The dispensing system of claim 5 wherein said plurality of said vent channels are aligned at the same angular location relative to said central axis.

8. The dispensing system of claim 4 wherein said exterior surface of said outer wall includes a plurality of said bottle stop projections arranged concentrically around a central axis of said system, wherein each one of said bottle stop projections defines an arc length, and said arc length of said plurality of said bottle stop projections increases with an increase in radial distance away from said central axis.

9. The dispensing system of claim 1 wherein said lid includes at least one laterally outwardly extending flexible frustoconical flange for securing said lid with said body.

10. The dispensing system of claim 1 wherein said body includes at least one laterally inwardly extending bead for securing said body with said lid.

11. The dispensing system of claim 1 wherein said lid includes an annular plug and said body includes an internal sealing wall connected to said outer wall by at least one supporting rib.

12. The dispensing system of claim 1 wherein said post has a leading edge and a trailing edge, wherein said leading edge is located further than said trailing edge, relative to said press portion in an axial direction along a central axis of said system.

13. The dispensing system of claim 12 wherein said post includes a wall with a helical configuration.

14. The dispensing system of claim 12 wherein said post includes at least two transverse walls that intersect in a cross-shaped configuration.

15. The dispensing system of claim 12 wherein said post includes plurality of walls that intersect in a star-shaped configuration.

16. The dispensing system of claim 9 wherein said at least one laterally outwardly extending flexible frustoconical flange slopes radially inwardly toward a central axis of said system in an axially downward direction toward a leading edge of said post.

17. The dispensing system of claim 1 wherein said sealed bottom end of said body includes a frangible portion of said body that is breached by movement of said post with said lid in said second position to create said dispensing orifice, wherein said frangible portion of said body includes an annular line of reduced thickness material of said body centered on a central axis of said system.

18. The dispensing system of claim 2 wherein said plurality of bottle stop projections are sized and shaped to accommodate a container having an opening diameter between about 28 mm and about 51 mm.

19. The dispensing system of claim 1 in combination with a fluent substance, said system and said fluent substance together defining a package.

* * * * *